US012612813B2

(12) United States Patent
Liang et al.

(10) Patent No.: US 12,612,813 B2
(45) Date of Patent: Apr. 28, 2026

(54) HINGE AND OPENING AND CLOSING DEVICE

(71) Applicants: HEFEI MIDEA REFRIGERATOR CO., LTD., Hefei (CN); HEFEI HUALING CO., LTD., Hefei (CN); MIDEA GROUP CO., LTD., Foshan (CN)

(72) Inventors: Benlei Liang, Hefei (CN); Liangjin Hu, Hefei (CN); Peng Zhao, Hefei (CN)

(73) Assignees: HEFEI MIDEA REFRIGERATOR CO., LTD., Hefei (CN); HEFEI HUALING CO., LTD., Hefei (CN); MIDEA GROUP CO., LTD., Foshan (CN)

( * ) Notice: Subject to any disclaimer, the term of this patent is extended or adjusted under 35 U.S.C. 154(b) by 38 days.

(21) Appl. No.: 18/482,877

(22) Filed: Oct. 7, 2023

(65) Prior Publication Data

US 2024/0209664 A1 Jun. 27, 2024

(30) Foreign Application Priority Data

Dec. 23, 2022 (CN) ......................... 202223528193.7
Dec. 23, 2022 (CN) ......................... 202223528322.2
Jun. 20, 2023 (CN) ......................... 202310746666.0

(51) Int. Cl.
*E05D 3/02* (2006.01)
*E05F 3/18* (2006.01)
(Continued)

(52) U.S. Cl.
CPC .................. *E05D 3/02* (2013.01); *E05F 3/18* (2013.01); *E05F 3/20* (2013.01); *E05F 5/08* (2013.01);
(Continued)

(58) Field of Classification Search
CPC .... E05D 3/02; E05D 3/18; E05D 5/08; E05D 7/0054; E05D 2011/1035;
(Continued)

(56) References Cited

U.S. PATENT DOCUMENTS 3,975,794 A * 8/1976 Kaiser .................. E05F 1/1223 16/303
4,215,449 A * 8/1980 Loikitz .................. E05F 1/063 16/303
(Continued)

FOREIGN PATENT DOCUMENTS

CN 203961552 U 11/2014
CN 107165516 A 9/2017
(Continued)

OTHER PUBLICATIONS

EESR received in EP Application No. 23203663.2; mailed Jul. 1, 2024.
(Continued)

*Primary Examiner* — Jason W San
*Assistant Examiner* — Matthew J Sullivan
(74) *Attorney, Agent, or Firm* — K&L Gates LLP

(57) ABSTRACT

The present application relates to the field of household appliances and discloses a hinge and an opening and closing device. The hinge includes a first hinge seat, a second hinge seat, a sliding member, and an elastic member. The first hinge seat has a first matching structure, the first matching structure has a first curved surface and a first matching surface; the second hinge seat has a first accommodating cavity extending in a first direction, an end of the first accommodating cavity having a first opening; the sliding member is provided in the first accommodating cavity and the sliding member may slide in the first direction. The sliding member has a second matching structure, the second
(Continued)

matching structure has a second curved surface and a second matching surface, and the second matching structure is connected to the first matching structure through the first opening.

19 Claims, 15 Drawing Sheets

(51) Int. Cl.
*E05F 3/20* (2006.01)
*E05F 5/08* (2006.01)
*F25D 23/02* (2006.01)

(52) U.S. Cl.
CPC ...... *F25D 23/028* (2013.01); *F25D 2323/024* (2013.01)

(58) Field of Classification Search
CPC .... E05D 2011/1078; E05D 11/06; E05F 3/20; E05F 1/1223; F25D 23/028; F25D 2323/024
See application file for complete search history.

(56) References Cited

U.S. PATENT DOCUMENTS

| | | | | |
|---|---|---|---|---|
| 7,062,817 | B2 * | 6/2006 | Lee | E05F 1/1223 16/334 |
| 7,320,152 | B2 * | 1/2008 | Lowry | G06F 1/1616 16/334 |
| 7,383,618 | B2 * | 6/2008 | Lu | H04M 1/0216 16/303 |
| 7,818,845 | B2 * | 10/2010 | Hu | H04M 1/0216 16/303 |
| 8,444,234 | B2 * | 5/2013 | Kim | D06F 39/14 312/328 |
| 8,770,675 | B2 * | 7/2014 | Vom Stein | F16J 15/3456 305/105 |
| 9,290,880 | B2 * | 3/2016 | Park | D06F 39/14 |
| 9,291,385 | B2 * | 3/2016 | Hwang | E05D 7/00 |
| 9,394,645 | B2 * | 7/2016 | Park | D06F 39/14 |
| 9,416,574 | B2 * | 8/2016 | Mitchell | E05F 1/1223 |
| 9,957,743 | B2 * | 5/2018 | Chen | E05F 5/10 |
| 9,995,069 | B2 * | 6/2018 | Ghantous | E05F 1/043 |
| 11,435,024 | B2 * | 9/2022 | Chen | E05F 1/1215 |
| 11,767,694 | B2 * | 9/2023 | Naganuma | E05D 11/1078 16/221 |
| 12,139,951 | B2 * | 11/2024 | Lehti | E05D 11/06 |
| 2005/0108853 | A1 | 5/2005 | Lee | |
| 2006/0032022 | A1 * | 2/2006 | Minami | G06F 1/1681 16/342 |
| 2006/0242792 | A1 * | 11/2006 | Kienle | E05D 11/1078 16/252 |
| 2009/0126154 | A1 * | 5/2009 | Lin | G06F 1/1681 16/286 |
| 2024/0068286 | A1 * | 2/2024 | Larson | E05D 11/1078 |
| 2024/0209664 | A1 * | 6/2024 | Liang | E05D 3/02 |
| 2024/0426151 | A1 * | 12/2024 | Liang | E05D 11/1014 |

FOREIGN PATENT DOCUMENTS

| | | | | |
|---|---|---|---|---|
| CN | 107165516 | B | | 8/2018 |
| CN | 110593687 | A | | 12/2019 |
| CN | 210087070 | | | 2/2020 |
| CN | 111734244 | A | | 10/2020 |
| CN | 212507859 | | | 2/2021 |
| CN | 217925403 | U | * | 11/2022 |
| CN | 217950072 | | | 12/2022 |
| DE | 102009049814 | A1 | | 4/2011 |
| GB | 2439328 | B | | 7/2012 |
| IT | 201900005910 | A1 | | 10/2020 |
| KR | 101236011 | B1 | | 2/2013 |
| RU | 2525252 | C2 | | 8/2014 |
| RU | 2786112 | C1 | | 12/2022 |

OTHER PUBLICATIONS

Third Party's observation concerning the patentability of the invention of EP Application No. 23203663.2; mailed Aug. 16, 2024.
First OA Received in CN Application No. 202310746666.0; mailed Jan. 7, 2025.
The second office action received in the counterpart Canadian application 3,216,215, mailed on Aug. 22, 2025, 4 pages.

* cited by examiner

HINGE AND OPENING AND CLOSING DEVICE

CROSS-REFERENCES TO RELATED APPLICATIONS

The present disclosure claims the priorities of Chinese Patent Application No. 202223528193.7, filed on Dec. 23, 2022, Chinese Patent Application No. 202310746666.0, filed on Jun. 20, 2023, and Chinese Patent Application No. 202223528322.2, filed on Dec. 23, 2022, the entireties of which are herein incorporated by reference.

FIELD

The present application relates to the field of household appliances, in particular to a hinge and an opening and closing device.

BACKGROUND

This section only provides background information related to the present application and does not necessarily refer to prior art.

A freezer is a common type of opening and closing device, and it is generally provided with an upward opening door structure. When a door body of the freezer is opened, it is necessary to overcome the gravity of the door body, which makes it laborious to open the door body. When the door body of the freezer is closed, the door body may fall fast due to gravity, causing a severe collision between the door body and a cabinet body of the freezer, affecting the user's experience. In some technologies, providing an auxiliary structure on a hinge may provide some assistance during a door opening process and alleviate the problem of rapid dropping of the door body due to gravity and inertia during a door closing process. However, the providing of the auxiliary structure makes the hinge structure complex and occupy a large space, resulting in more labor in hinge assembly. In one embodiment, due to the increase in space occupied by the hinge, the size of the entire freezer will increase. When transporting the freezer, the increase in space occupied by the freezer reduces the number of freezers that may be loaded by transport and increases transportation costs.

SUMMARY

The purpose of the present application is to at least solve the problem of a complex hinge structure and large space occupation. The purpose of the present application is achieved through the following solution.

A hinge according to the embodiments of the present application, includes:

a first hinge seat, having a first matching structure, where the first matching structure has a first curved surface and a first matching surface;

a second hinge seat, having a first accommodating cavity extending in a first direction, and an end of the first accommodating cavity has a first opening;

a sliding member, provided in the first accommodating cavity, where the sliding member and the second hinge seat are fixed relatively in a circumferential direction of the first accommodating cavity, the sliding member is slidable along the first direction in the first accommodating cavity, and the sliding member has a second matching structure, the second matching structure having a second curved surface and a second matching surface, the second matching structure abuts against the first matching structure through the first opening; and an elastic member, provided in the first accommodating cavity and located at an end of the sliding member facing away from the first matching structure, where the elastic member applies a thrust to the sliding member to move the sliding member towards the first matching structure;

where the hinge has a first state and a second state, and the first hinge seat is reciprocally rotatable relative to the second hinge seat around an axis extending in the first direction within a predetermined angle range, to slide the first matching structure relative to the second matching structure and switch the hinge between the first state and the second state; and in the first state, the first matching surface abuts against the second matching surface, and in the second state, the first curved surface abuts against the second curved surface to cause the first hinge seat and the second hinge seat to have a force for relative rotation under the thrust.

According to the hinge of the present application, the hinge may be connected between the cabinet and the door body of an opening and closing device (such as a freezer), to hinge the door body with the cabinet. The door body may be connected to the first hinge seat, and the cabinet may be connected to the second hinge seat. During an opening process of the door body, when the hinge rotates to the second state, the thrust generated by the elastic member under the matching of the first curved surface and the second curved surface may cause the first hinge seat and the second hinge seat to have a relative rotational force, i.e., cause the first hinge seat to have a relative rotational torque to the second hinge seat, the thrust applied by the elastic member to the sliding member may assist the opening of the door body through the first curved surface and the second curved surface; during the closing process of the door body, the elastic member forms a force on the hinge that may at least balance a part of gravity of the door body, alleviating the problem of rapid dropping of the door body which causes a severe collision between the door body and the cabinet, and improving the user experience. The elastic member and the sliding member are both provided in the first accommodating cavity of the second hinge seat. The hinge may convert the thrust of the elastic member along the first direction into a force in the rotation direction of the hinge. The hinge has a simple structure and is easy to assemble, reduces the occupied space, increases the number of opening and closing devices that may be loaded on the transport, and reduces the transportation costs of the opening and closing device.

In addition, the hinge according to the present application may further include the following features.

In some embodiments of the present application, at least one of the first curved surface or the second curved surface is helical surface.

In some embodiments of the present application, the first curved surface extends along the first direction, and the first matching surface is provided at an end of the first curved surface close to the second matching structure; and the second curved surface extends along the first direction, and the second matching surface is provided at an end of the second curved surface close to the first matching structure.

In some embodiments of the present application, both the first matching surface and the second matching surface are perpendicular to the first direction.

In some embodiments of the present application, the first hinge seat includes a first lock plate and a first hinge portion, the first lock plate is integrated with the first hinge portion, and the first matching structure is provided on the first hinge portion.

In some embodiments of the present application, the second hinge seat includes a second lock plate and a second hinge portion, the second lock plate is integrated with the second hinge portion, and the first accommodating cavity is provided with the second hinge portion.

In some embodiments of the present application, the first lock plate is provided with a first mounting hole, the first mounting hole is matched with a fixing member to fix the first lock plate on an opening and closing device.

In some embodiments of the present application, the second lock plate includes a first sub-lock plate and a second sub-lock plate, the first sub-lock plate and the second sub-lock plate are provided at intervals, the first sub-lock plate is embedded in a trench of the opening and closing device, and the second sub-lock plate is provided with a second mounting hole, the second mounting hole is matched with a fixing member to connect the second sub-lock plate with the opening and closing device.

In some embodiments of the present application, the first hinge portion is provided with a second accommodating cavity, the second accommodating cavity is provided with a second opening, the second opening is opposite to and communicates with the first opening, the first matching structure is provided in the second accommodating cavity, and an end of the first hinge portion with the second opening is connected to an end of the second hinge portion with the first opening in a sealed manner.

In some embodiments of the present application, at least one of the first matching surface, the second matching surface, the first curved surface or the second curved surface is provided with an oil storage tank.

In some embodiments of the present application, the second hinge portion is provided with a relief hole at an end away from the first opening, the relief hole communicates with the first accommodating cavity; and/or the first hinge portion is provided with a relief hole at an end away from the second opening, the relief hole communicates with the second accommodating cavity.

In some embodiments of the present application, a side of the first lock plate close to the second hinge portion is provided with a first stop, a side of the second sub-lock plate close to the first hinge portion is provided with a second stop, and the first stop is matched with the second stop to limit a maximum angle for rotation between the first hinge seat and the second hinge portion.

In some embodiments of the present application, the first hinge seat is provided with a first positioning portion, and the second hinge seat is provided with a second positioning portion, the second positioning portion is matched with the first positioning portion to position the first hinge seat and the second hinge seat at an initial mounting angle, the first positioning portion is disconnected from the first hinge seat and/or the second positioning portion is disconnected from the second hinge seat.

In some embodiments of the present application, an outer circumferential wall of the sliding member is provided with a first guiding structure extending in the first direction, and the second hinge seat in the first accommodating cavity is provided with a second guiding structure extending in the first direction, the first guiding structure is matched with the second guiding structure to fix the sliding member and the second hinge seat relatively in a circumferential direction of the first accommodating cavity, and to move the sliding member along the first direction.

In some embodiments of the present application, the first hinge seat, the second hinge seat, and the sliding member are all made of hard plastic parts.

An opening and closing device according to the present application, including:

a cabinet, having an opening;

a door body, hinged to the opening of the cabinet through any hinge provided in the present application or any embodiment of the present application.

The opening and closing device according to the present application, including the hinge provided in the present application or any embodiment of the present application, has at least an effect of the effects of the hinge provided in the present application or any embodiment of the present application.

In addition, the opening and closing device according to the present application may further have the following features.

In some embodiments of the present application, the opening and closing device is a freezer.

BRIEF DESCRIPTION OF THE DRAWINGS

By reading the detailed description of the embodiments below, the embodiments will be made clear. The accompanying drawings are only intended to illustrate the embodiments and are not considered a limitation of the present application. Throughout all the drawings, the same part is represented by the same reference sign. In the drawings.

REFERENCE NUMERALS

Figure 1:
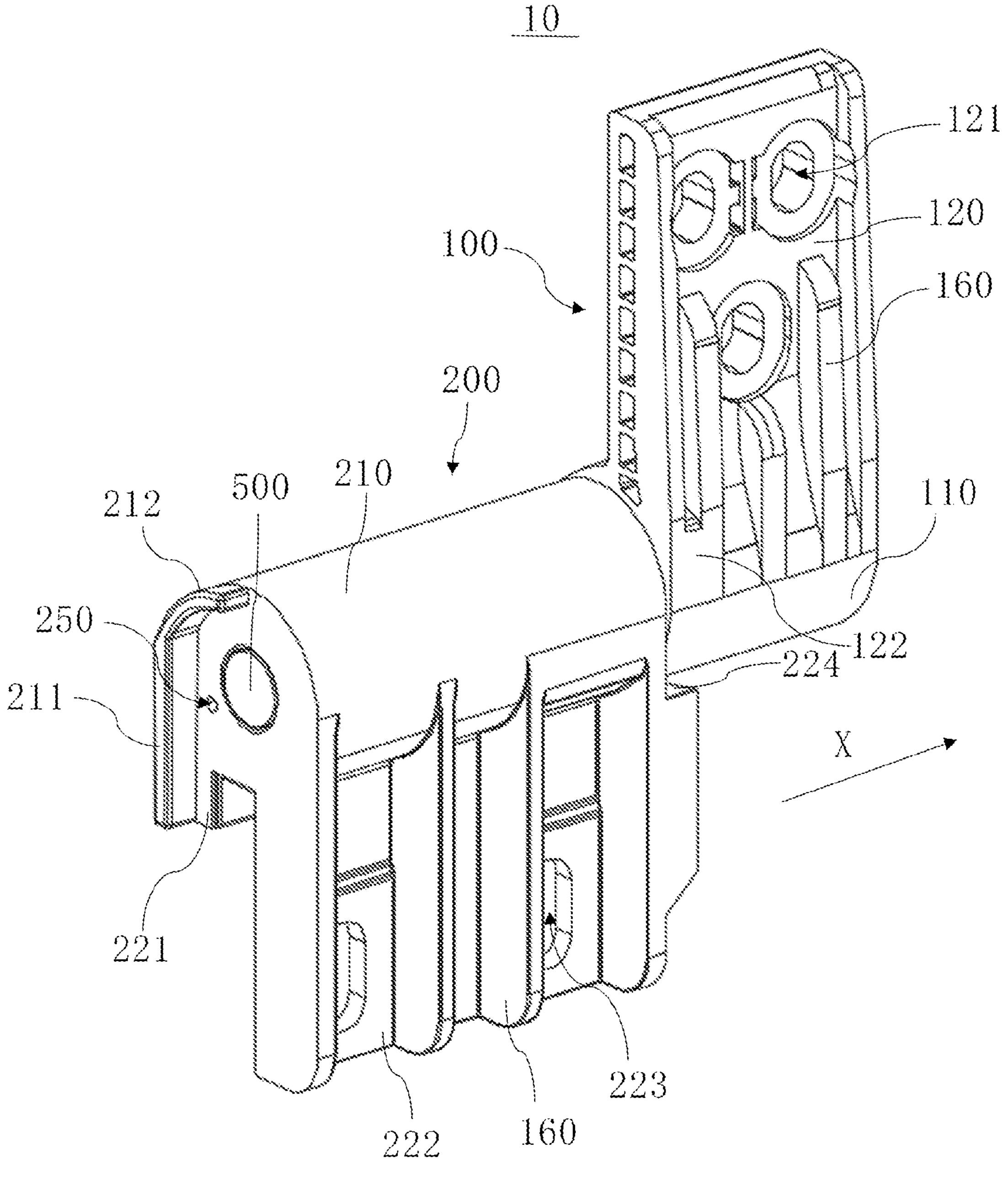
FIG. 1 is a schematic diagram of a hinge according to embodiments of the present application.

10: hinge;

100: first hinge seat; 110: first hinge portion; 111: second connecting surface; 112: annular step; 113: annular groove; 120: first lock plate; 121: first mounting hole; 122: first stop; 130: second accommodating cavity; 140: first matching structure; 141: first curved surface; 142: first matching surface; 143: first bottom surface; 144: oil storage tank; 150: first positioning portion; 160: reinforced rib;

200: second hinge seat; 210: second hinge portion; 211: raised strip; 212: extension portion; 213: annular boss; 214: annular protrusion; 215: first connecting surface; 221: first sub-lock plate; 222: second sub-lock plate; 223: second mounting hole; 224: second stop; 230: first accommodating cavity; 231: second guiding structure; 240: second positioning portion; 250: relief hole;

300: sliding member; 310: second matching structure; 311: second curved surface; 312: second matching surface; 313: second bottom surface; 320: first guiding structure;

400: elastic member;

500: connecting shaft; 510: through hole;

600: shim; 610: notch;

20: cabinet; 202: third opening; 203: fourth opening; 204: mounting cavity; 105: trench; 206: opening; 207: slot;

30: door body;

X: first direction.

DETAILED DESCRIPTION OF THE DISCLOSURE

Exemplary embodiments of the present application are described in more detail below with reference to the accompanying drawings. Although the exemplary implementation of the present application is shown in the accompanying drawings, it should be noted that the present application may be implemented in various forms and should not be limited by the implementation described here. The implementation is provided in order to have a more thorough understanding for the present application and to fully convey the scope of the present application.

It should be noted that the terms used in the description are only for the purpose of describing specific exemplary implementation and are not intended to be restrictive. Unless the context clearly indicates otherwise, singular forms such as "a", "one", and "the" used in the description may also indicate to include plural forms. The terms "include", "comprise", "contain", and "have" are inclusive and therefore indicate the existence of the stated features, steps, operations, elements, and/or parts, but do not exclude the existence or addition of one or more other features, steps, operations, elements, parts, and/or combinations of them. The steps, processes, and operations described in the description are not interpreted as requiring them to be executed in the specific order described or explained, unless the order of execution is explicitly indicated. It should also be noted that additional or alternative steps may be used.

Although the terms "first", "second", "third", etc., may be used in the description to describe elements, parts, regions, layers, and/or sections, these elements, parts, regions, layers, and/or sections should not be limited by these terms. These terms may only be used to distinguish an element, part, region, layer, or section from another element, part, region, layer, or section. Unless explicitly indicated in the context, terms such as "first", "second", and other numerical terms do not imply order or sequence when used in the description. Therefore, the first element, part, region, layer or section discussed below may be referred to as the second element, part, region, layer or section without departing from the teachings of the exemplary implementation.

For ease of description, spatial relative relationship terms may be used in the description to describe the relationship between an element or feature shown in the figure and another element or feature. The relative relationship terms are, for example, "internal", "external", "inside", "outside", "below", "lower", "above", "upper", etc. This spatial relative relationship term means to include different orientations of devices in use or operation, except for those depicted in the diagram. For example, if the device in the diagram is flipped, the elements described as "below other elements or features" or "under other elements or features" will then be oriented as "above other elements or features" or "on other elements or features". Therefore, the example term "below" may include both upper and lower orientations. The device may be additionally oriented (rotated by 90 degrees or in other directions) and the spatial relative relationship descriptors used in the description are explained accordingly.

For an opening and closing device with an upward opening door, such as a freezer, a side of the door body (generally the rear side) and a side of the cabinet (generally the rear side) are hinged to enable the door body to rotate on the hinged side to open and close. Common hinges used for the opening and closing device include plain butt hinges and spring-loaded butt hinges. The plain butt hinge has a structure in which the upper seat and lower seat are connected by a rotating shaft, and this type of hinge is simple, without a spring to assist, and may occupy small space. However, when using this type of hinge, the door body only relies on the thrust applied by the user when opening, making it laborious to open the door. In one embodiment, when closing the door body, the door body falls fast due to gravity and inertia, causing a severe collision between the door body and a cabinet body, affecting the user experience. The working manner of the spring-loaded butt hinge is to vertically provide a compressed spring along the rear side wall of the cabinet body, and the compressed spring may fit with a connecting rod to provide assistance along an opening direction of the door body to the hinge upper seat during the opening process of the door body. For example, the spring force acts on the connecting rod of the first hinge seat. When the first hinge seat rotates around the rotating shaft, the connecting rod rotates around the rotating shaft. On the one hand, the spring-loaded butt hinge requires a relatively great spring force, because the torque applied by the spring on the connecting rod is relatively low, in order to ensure the thrust, the spring force needs to be sufficiently great, which requires a greater outer diameter of the spring, usually greater than 15 mm. On the other hand, the thickness of the hinge is generally greater than 20 mm after assembly, which takes up a large amount of space and is not conducive to increasing the loading capacity of transport, leading to an increase in transportation costs. In order to alleviate the problem of spring-loaded butt hinges occupying much space, in some technologies, the hinge is provided in the cabinet. However, for a freezer, this will reduce the thickness of the foam layer corresponding to a position where the hinge is provided, bring a risk of condensation at this position. As the thickness of the cabinet continues to decrease, the risk of condensation increases, which affects the quality of the freezer.

It may be concluded that an urgent problem to be addressed is that reducing the impact of product space occupancy of the hinge without reducing the thickness of the foam layer and without affecting the basic performance of the product.

In response to the above problems, as shown in FIGS. 1 to 21, embodiments of the present application provide a hinge 10. The hinge 10 includes a first hinge seat 100, a second hinge seat 200, a sliding member 300, and an elastic member 400.

The first hinge seat 100 has a first matching structure 140, the first matching structure 140 having a first curved surface 141 and a first matching surface 142. The second hinge seat 200 has a first accommodating cavity 230 extending along a first direction X, and an end of the first accommodating cavity 230 has a first opening. The sliding member 300 is provided inside the first accommodating cavity 230, and the sliding member 300 and the second hinge seat 200 are fixed opposite in a circumferential direction of the first accommodating cavity 230. The sliding member 300 is slidable in the first direction X within the first accommodating cavity 230, and the sliding member 300 has a second matching structure 310, the second matching structure 310 having a second curved surface 311 and a second matching surface 312. The second matching structure 310 abuts against the first matching structure 140 through the first opening. The elastic member 400 is provided in the first accommodating cavity 230 and is located at an end of the sliding member 300 away from the second matching structure 310. The elastic member 400 applies a thrust to the sliding member 300 to move the sliding member 300 towards the first matching structure 140.

The hinge 10 has a first state and a second state. The first hinge seat 100 is reciprocally rotatable relative to the second hinge seat 200 around an axis extending in the first direction X within a predetermined angle range, causing the first matching structure 140 to slide relative to the second matching structure 310, to make the hinge 10 switch between the first state and the second state. In the first state, the first matching surface 142 abuts against the second matching surface 312, and in the second state, the first curved surface 141 abuts against the second curved surface 311, to make the first hinge seat 100 and the second hinge seat 200 have a force for relative rotation under the thrust.

The thrust causes the first hinge seat 100 and the second hinge seat 200 to have a force for relative rotation. For example, the force applied by the elastic member 400 to the sliding member 300, with the fit of the first curved surface 141 and the second curved surface 311, has a component force that causes the first hinge seat 100 to relatively rotate relative to the second hinge seat 200. As such, the first hinge seat 100 and the second hinge seat 200 have a relative rotation trend or rotate under this force. In other words, the elastic member 400 provides a torque to the first hinge seat 100 and the second hinge seat 200. When the hinge 10 is assembled to the opening and closing device, in generally, in the second state, the hinge 10 has a trend to rotate the door body towards a direction of opening the door body, that is, the hinge 10 has a force to rotate in the first rotation direction, and the first rotation direction is the same as the direction of opening the door body.

The first curved surface 141 may be a helical surface. The second curved surface 311 may also be a helical surface, and both the first curved surface 141 and the second curved surface 311 may extend along the first direction X. The first matching surface 142 may be set at an end of the first curved surface 141 close to the second matching structure 310, and the second matching surface 312 may be set at an end of the second curved surface 311 close to the first matching structure 140.

The first hinge seat 100 may be connected to the door body 30 of the opening and closing device, and the second hinge seat 200 may be connected to the cabinet 20 of the opening and closing device. During the opening or closing process of the door body 30, the second hinge seat 200 is fixed, and the first hinge seat 100 rotates synchronously with the door body 30.

When the hinge 10 is assembled on the opening and closing device, the first direction X may be configured to be parallel to the opening of the opening and closing device. When the opening and closing device is placed on a relatively flat ground, the first direction X may be understood as a horizontal direction. In a case where the opening and closing device has an upward opening door structure, the opening and closing side of the door body 30 is facing forward, and the hinge 10 is provided at the rear side of the opening and closing device, the first direction X may be a left or right direction of the opening and closing device.

When assembling the hinge 10, the first state of the hinge 10 may correspond to a closed state of the door body 30 of the opening and closing device and a state with a small opening angle of the door body 30. The second state may correspond to a maximum opening state of the door body 30 of the opening and closing device and a state with a large opening angle of the door body 30. In this way, the first rotation direction is also the opening direction of the door body 30. For example, a maximum opening angle of the door body 30 corresponding to the first state may be within a range of 15 degrees to 45 degrees from the closed state towards the opening direction. For example, the opening angle of the door body 30 corresponding to the first state is between 0 to 15 degrees, or 0 to 20 degrees, or 0 to 21 degrees, or 0 to 25 degrees, or 0 to 30 degrees, or 0 to 35 degrees, or 0 to 40 degrees, or 0 to 45 degrees, etc. The maximum opening angle of the door body 30 corresponding to the first state corresponds to a maximum opening angle where the hinge 10 may not buffer the closing of the door body 30 or assist in the opening of the door body 30. In other words, when the door body 30 opens from a closed state to exceed the maximum opening angle of the door body 30 corresponding to the first state, the first curved surface 141 abuts against the second curved surface 311, and the hinge 10 may assist in the opening of the door body 30; before the door body 30 rotates from the maximum open state to the maximum angle of opening corresponding to the first state, the first curved surface 141 abuts against the second curved surface 311, and the hinge 10 may buffer the closing of the door body 30.

In actual assembly, the elastic member 400 may be provided based on the gravity of the door body 30, and the elastic member 400 should make that the torque generated by the hinge 10 in the second state is greater than the torque generated by the gravity of the door body 30, and the door body 30 may hover in the second state of the hinge 10. In a case where the door body 30 may hover in the second state of the hinge 10, the opening angle of the door body 30 corresponding to the second state is also a hovering angle of the door body 30. The lower limit of the hovering angle range is consistent with the maximum opening angle of the door body 30 corresponding to the first state, that is, the maximum opening angle of the door body 30 corresponding to the first state is a critical point for hovering and non-hovering. When the opening angle of the door body 30 is greater than the maximum opening angle of the door body 30 corresponding to the first state, the door body 30 may hover. When the opening angle of the door body 30 is smaller than the maximum opening angle of the door body 30 corresponding to the first state, the door body 30 may not hover. The upper limit of the hovering angle range may be consistent with the angle at which the door body 30 opens to the maximum state.

The preset angle range of the rotation of the first hinge seat 100 relative to the second hinge seat 200 corresponds to an opening degree of the door body 30, that is, when the door body 30 is from the closed state to the maximum opening state, the angle range of the rotation of the door body 30 may be used as the preset angle range of the rotation of the first hinge seat 100 and the second hinge seat 200. In the present embodiment, the angle at which the door body 30 opens to the maximum state may be 70 degrees to 90 degrees. For example, the angle range of the rotation of the door body 30 may be 0 to 90 degrees, 0 to 85 degrees, 0 to 80 degrees, 0 to 75 degrees, or 0 to 70 degrees. In some technologies, the angle range of rotation of the door body 30 may be set to 0 to 80 degrees. At 0 degree, the door body 30 is closed, and at 80 degrees, the door body 30 is opened to the maximum state.

The first accommodating cavity 230 may be cylindrical in shape with an annular cross-section.

The first matching structure 140 and the second matching structure 310 may be a ratchet-like structure. In an embodiment, an end of the first hinge seat 100 facing the sliding member 300 may be provided with the ratchet-like structure, including first grooves at circumferential intervals. For example, the number of the first grooves may be two, three, or more, but in general, the number of the first grooves is set to two based on considering the occupied space and strength. A wall surface of a side wall of the first groove forms the first curved surface 141, and an end surface of the side wall of the first groove (i.e., a top surface of the side wall of the first groove) forms the first matching surface 142; the sliding member 300 is provided in a roughly cylindrical shape, and an end of the sliding member 300 towards the sliding member 300 may be provided with the ratchet-like structure, including second grooves at circumferential intervals. The second grooves correspond to the first grooves one by one, and a wall surface of a side wall of the second groove (i.e., a top surface of the side wall of the second groove) forms the second curved surface 311, and an end surface of the side wall of the second groove forms the second matching surface 312.

When the first hinge seat 100 rotates relative to the second hinge seat 200, the first matching structure 140 and the second matching structure 310 may slide relative to each other, causing different positions of the first matching structure 140 to match with different positions of the second matching structure 310. When the door body 30 is closed, the hinge 10 may be in the first state, and the first matching surface 142 is abuts against the second matching surface 312. At this time, the elastic member 400 is in a compressed state, and the first matching surface 142 and the second matching surface 312 may be set as end surfaces perpendicular to the first direction X. As such, the thrust applied by the elastic member 400 to the sliding member 300 will not cause the hinge 10 to generate a torque, and the door body 30 may be covered on the cabinet 20 by gravity. During the opening process of the door body 30, the first matching surface 142 slides relative to the second matching surface 312 and gradually transforms into a state that the first curved surface 141 abuts against the second curved surface 311, the first curved surface 141 slides relative to the second curved surface 311 on the second curved surface 311, and the elastic member 400 gradually resets while applying a gradually-decreased thrust to the sliding member 300. In a case where the first curved surface 141 abuts against the second curved surface 311, i.e., in the second state, the thrust applied by the elastic member 400 to the sliding member 300 generates a force in a radial tangent direction at the contact position between the first curved surface 141 and the second curved surface 311, and this force causes the door body 30 to have a trend to rotate towards the opening direction, to balance the gravity of the door body 30. When the door body 30 is opened to the maximum opening degree, the first curved surface 141 and the second curved surface 311 may still maintain contact, and when the door body 30 is opened to the maximum opening degree, the ratchet-like structure of the first hinge seat 100 and the ratchet-like structure of the sliding member 300 may engage and fit, that is, the side wall of the first groove inserts into the second groove, and the side wall of the second groove inserts into the first groove. The first matching surface 142 may abut against the bottom surface (a second bottom surface 313) of the second groove, and the second matching surface 312 may abut against the bottom surface (a first bottom surface 143) of the first groove.

The elastic member 400 may be a spring, and the spring may always be in a compressed state after the hinge 10 is assembled, to make the spring apply thrust to the sliding member 300.

According to the present embodiment, the hinge 10 may be connected between the cabinet 20 and the door body 30 of the opening and closing device (such as a freezer), and the door body 30 is hinged with the cabinet 20. The door body 30 may be connected to the first hinge seat 100, and the cabinet 20 may be connected to the second hinge seat 200. The first hinge seat 100 may rotate relative to the second hinge seat 200 in the first rotation direction to open the door body 30. In the present embodiment, the hinge 10 may convert a lateral force of the elastic member 400 (i.e., the spring) into a force consistent with the rotation direction of the first hinge seat 100 through the matching of the sliding member 300 and first matching structure 140, ultimately achieving the rotation of the hinge 10 and the opening and closing of the door body 30. In an embodiment, during the opening process of the door body 30, when the hinge 10 rotates to the second state, the elastic member 400 causes the first hinge seat 100 to have a force to rotate in the first rotation direction relative to the second hinge seat 200, that is, the thrust applied by the elastic member 400 to the sliding member 300 may assist the opening of the door body 30 through the first curved surface 141 and the second curved surface 311; during the process of closing the door body 30, the force exerted by the elastic member 400 on the hinge 10 may balance at least a part of the gravity of the door body 30, alleviating the problem of rapid dropping of the door body 30, which avoids a severe collision between the door body 30 and the cabinet 20, and improves the user experience. The elastic member 400 and the sliding member 300 are both provided in the first cavity 230 of the second hinge seat 200. The hinge 10 may convert the thrust of the elastic member 400 along the first direction X into a rotational force of the hinge 10. The hinge 10 has a simple structure and is easy to assemble, having a small space occupation, increasing the number of opening and closing devices that may be loaded on the transport, and reducing the transportation costs.

Furthermore, both the elastic member 400 and the sliding member 300 are disposed in the first accommodating cavity 230 of the second hinge seat 200. The elastic member 400 is a built-in member, which reduces the risk that the hinge 10 pinches the fingers of users or assembly personnel and improves safety.

In the present embodiment, the axial force of the elastic member 400 in the first direction X may be converted into a relatively large torque for rotation of the first hinge seat 100 through the first matching structure 140 and the second matching structure 310. In this way, the elasticity required for the elastic member 400 is reduced. In a case where the elastic member 400 is a spring, the wire diameter of the spring may be about 2.5 mm, and the outer diameter of the overall spring may be no more than 16 mm, for example, which may be 15.8 mm, etc. Due to the reduction of the size of the elastic member 400, an impact of the hinge 10 on the space occupancy rate of the opening and closing device may be reduced, that is, a protrusion of the rear side of the hinge 10 from the side wall of the cabinet 20 may be reduced. Combined with the reasonable design of the cabinet 20, when mounting the hinge 10 to the opening and closing device, the protrusion of the hinge 10 from the side wall of the cabinet 20 in the present embodiment may be no more than 10 mm, which enhances an overall loading volume of the product and saves transportation costs.

It should be noted that in the present embodiment, the first hinge seat 100 is connected to the door body 30 of the opening and closing device, and the second hinge seat 200 is connected to the cabinet 20 of the opening and closing device. However, during actual assembly, the first hinge seat 100 may be connected to the cabinet 20 of the opening and closing device, and the second hinge seat 200 may be connected to the door body 30 of the opening and closing device as required. That is, the first hinge seat 100 is fixedly disposed relative to the cabinet 20, and the second hinge seat 200 rotates synchronously together with the door body 30. The first hinge seat 100 is fixed. Based on the relativity of motion, the rotation of the first hinge seat 100 relative to the second hinge seat 200 may be achieved through the rotation of the second hinge seat 200.

It should also be noted that the first matching surface 142 and the second matching surface 312 may not be flat surfaces perpendicular to the first direction X. The settings of the first matching surface 142 and the second matching surface 312 are that as long as they do not cause the thrust applied by the elastic member 400 to the sliding member 300 to generate a force that causes the door body 30 to open. For example, the first matching surface 142 and the second matching surface 312 may also be curved surfaces. The curved surface serving as the first matching surface 142 is opposite to a spiral direction of the first curved surface 141, and the curved surface serving as the second matching surface 312 is opposite to a spiral direction of the second curved surface 311. Therefore, when the first matching surface 142 abuts against the second matching surface 312, the elastic member 400 may generate a force to rotate the door body 30 towards the closing direction, thereby the door body 30 better covers the cabinet 20.

Figure 2:
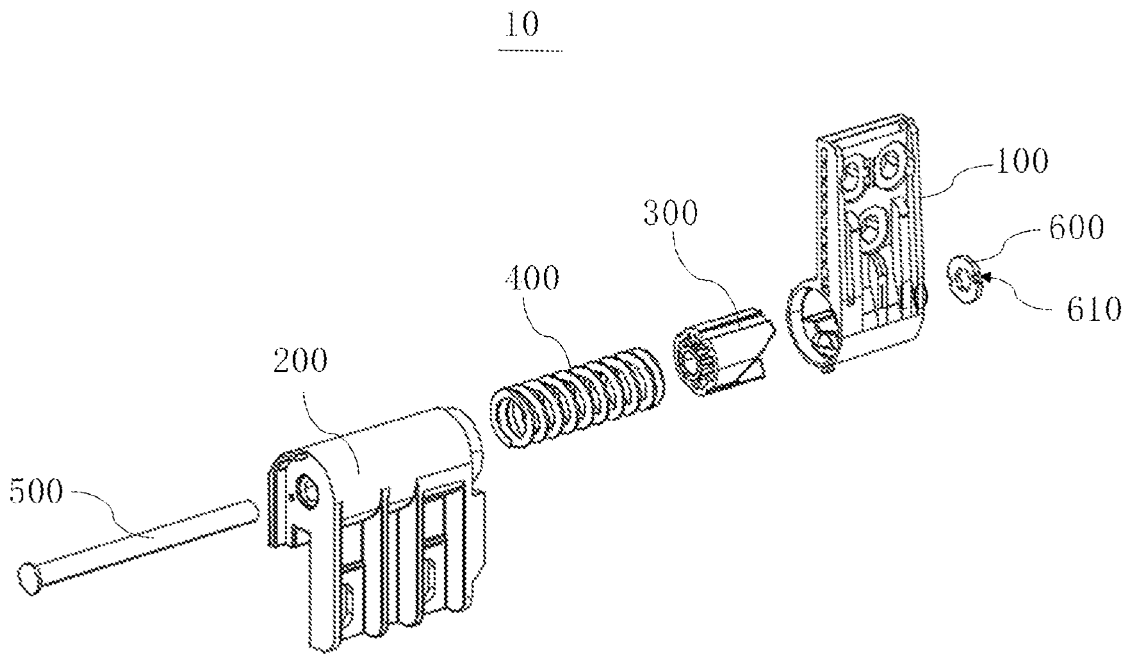
FIG. 2 is a split schematic diagram of a hinge according to embodiments of the present application.
Figure 4:
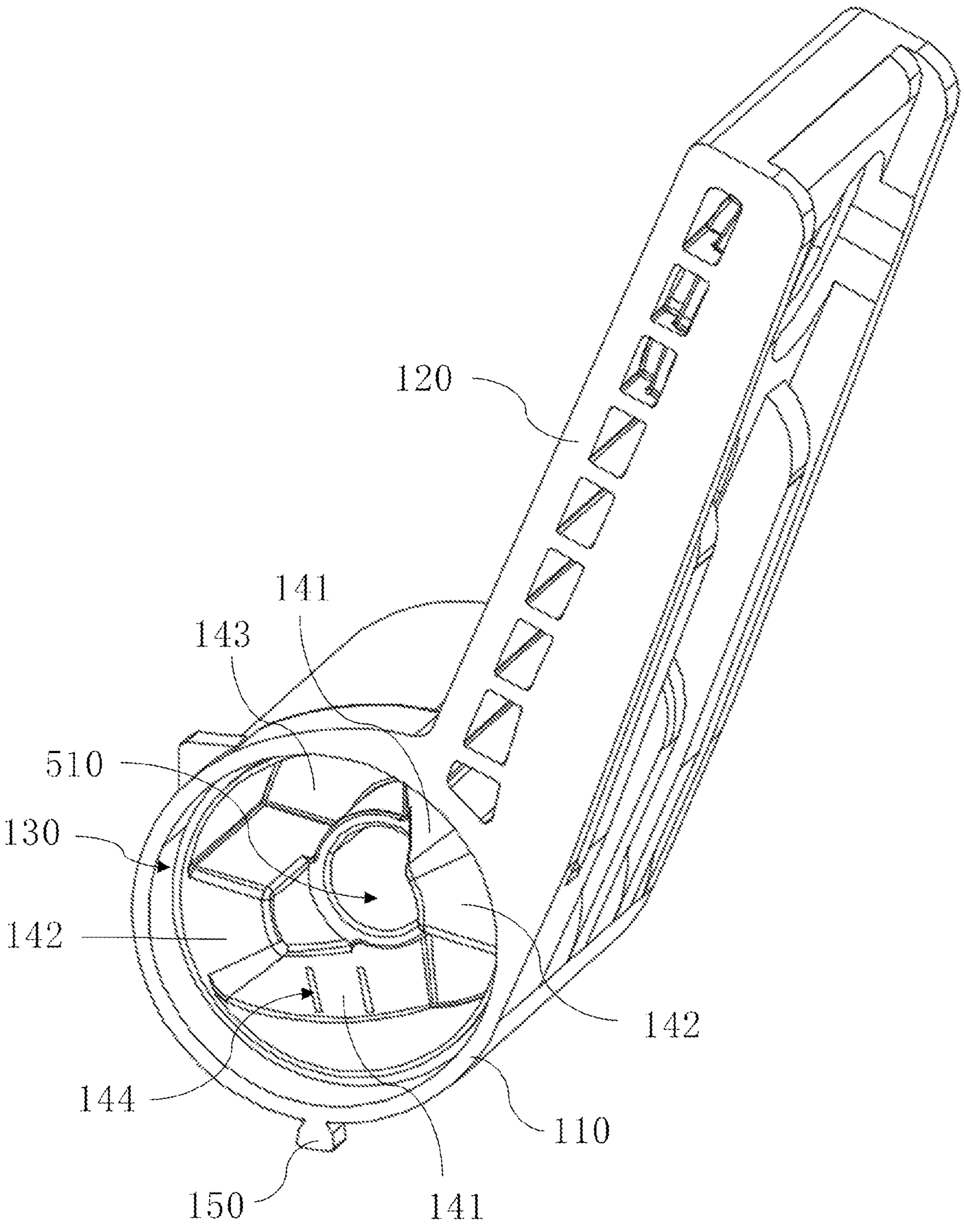
FIG. 4 is a schematic diagram of a first hinge seat from a perspective according to embodiments of the present application.

According to some embodiments of the present application, as shown in FIGS. 1, 2, and 4, the first hinge seat 100 includes a first lock plate 120 and a first hinge portion 110. The first lock plate 120 is integrated with the first hinge portion 110, and the first matching structure 140 is provided on the first hinge portion 110. The second hinge seat 200 includes a second lock plate and a second hinge portion 210, the second lock plate is integrated with the second hinge portion 210. The first accommodating cavity 230 is provided with a second hinge portion 210. The first hinge portion 110 and the second hinge portion 210 may be rotatably connected, the first lock plate 120 is connected to the door body 30 of the opening and closing device, and the second lock plate is connected to the cabinet 20 of the opening and closing device.

The first hinge seat 100 may be injection-molded, that is, the first lock plate 120 and the first hinge portion 110 are formed through injection molding. The second hinge seat 200 may be injection-molded, that is, the second lock plate and the second hinge portion 210 are formed through injection molding.

The first lock plate 120 may be provided with one or more first mounting hole 121 used for being matched with a fixing member to fix the first lock plate 120 on the door body 30. The fixing member may be a bolt, a screw, etc. In an embodiment, the fixing member is a bolt.

The second lock plate includes a first sub-lock plate 221 and a second sub-lock plate 222, where the second sub-lock plate 222 is provided with one or more second mounting holes 223, used for being matched with the fixing member to fix the second sub-lock plate 222 on the cabinet 20. The fixing member may be a bolt, a screw, etc. The first sub-lock plate 221 is fixedly connected to the second hinge portion 210, and the first sub-lock plate 221 is located on a side of the second sub-lock plate 222 close to the door body 30. The first sub-lock plate 221 is inserted into and fixed with the cabinet 20, and the first sub-lock plate 221 may be inserted into and matched with a trench 105 disposed horizontally or vertically on the cabinet 20. The first sub-lock plate 221 is connected to the cabinet 20 through insertion. During the opening process of the door body 30, i.e., when the first hinge seat 100 rotates, the first sub-lock plate 221 is the main part that bears the torque, while the second sub-lock plate 222 is fixed through the second mounting hole, which may strengthen the fixation of the second hinge seat 200 with the door body 30 and prevent the second hinge seat 200 from moving. Both the first sub-lock plate 221 and the second sub-lock plate 222 may be integrated with the second hinge portion 210.

Figure 16:
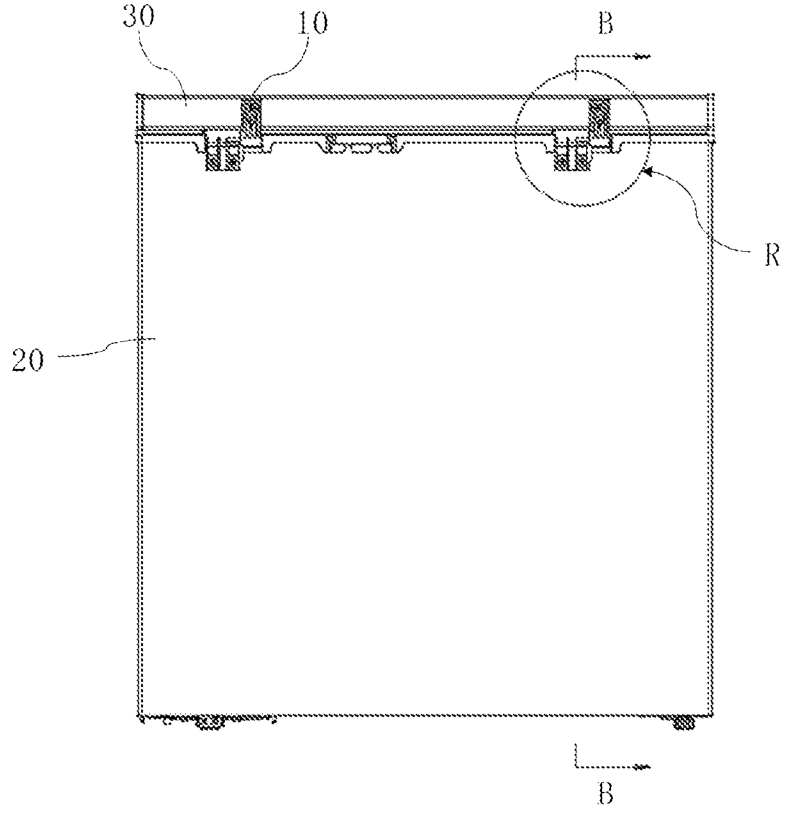
FIG. 16 is a schematic rear diagram of an opening and closing device according to embodiments of the present application.
Figure 17:
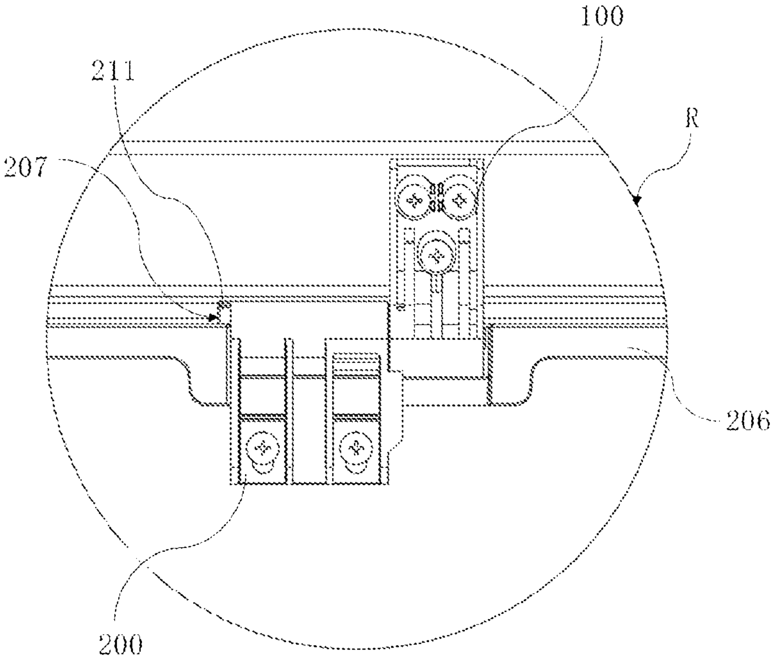
FIG. 17 schematically illustrates an enlarged view of part R in FIG. 16.
Figure 18:
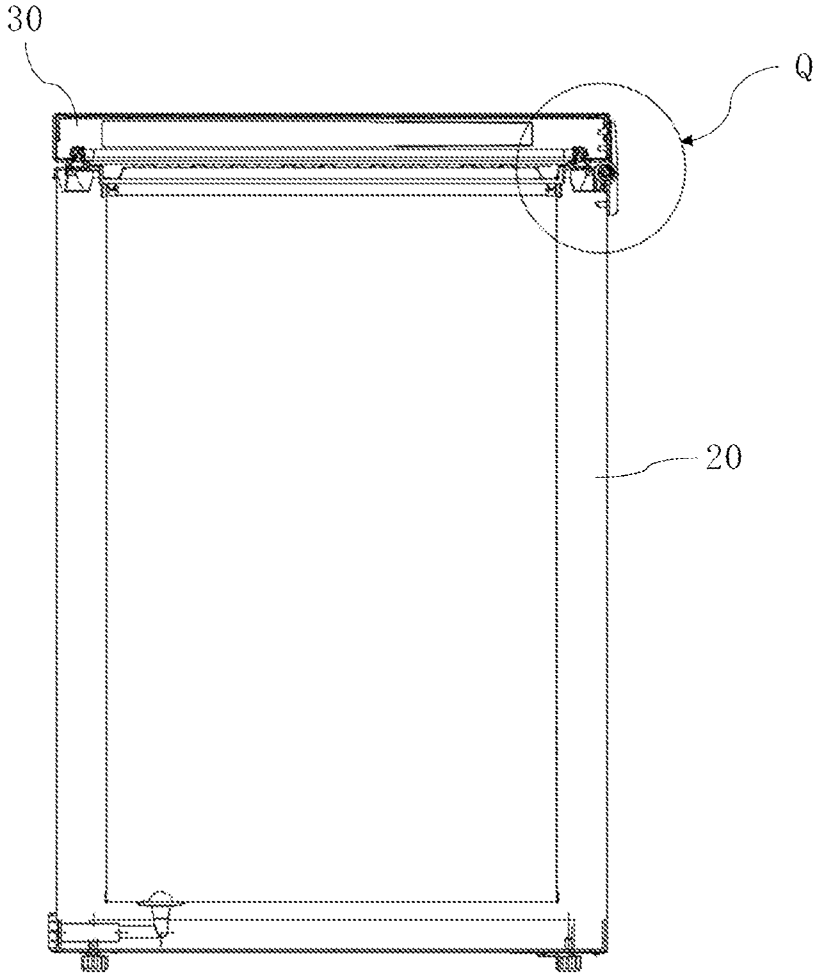
FIG. 18 schematically illustrates a B-B cross-sectional view in FIG. 16.
Figure 19:
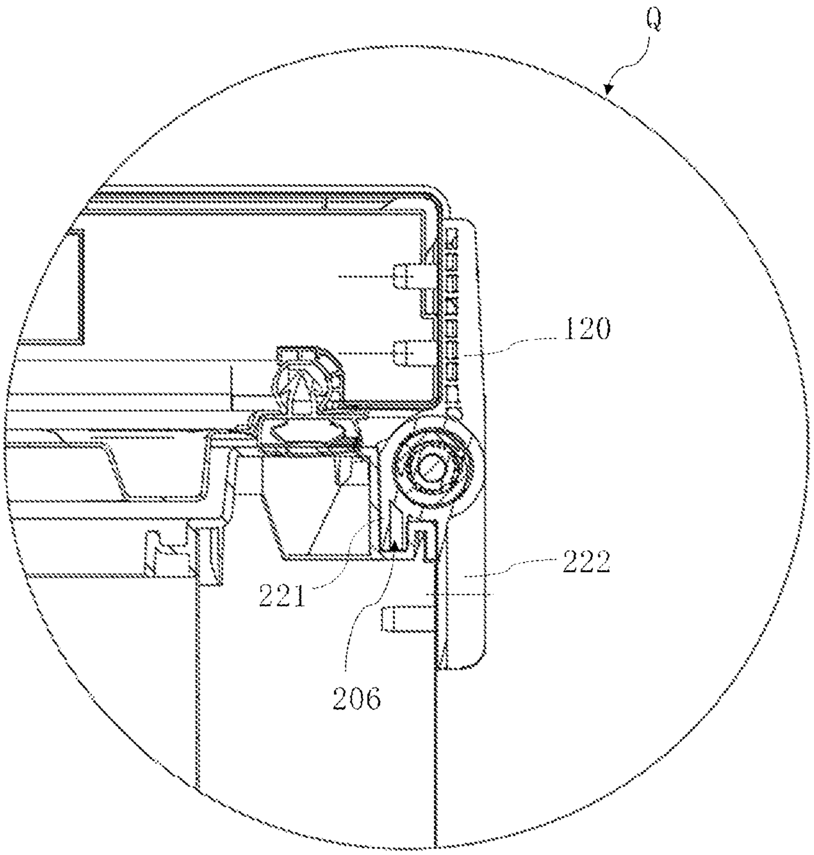
FIG. 19 schematically illustrates an enlarged view of part Q in FIG. 18.

In an embodiment, as shown in FIG. 1, FIG. 2, and FIG. 4 in combination with FIG. 16 and FIG. 17 FIGS, the first lock plate 120 has a door body mounting surface facing the door body 30. The door body mounting surface may be a flat surface, and the first lock plate 120 is attached to an end surface of the door body 30 through the door body mounting surface. A bolt or screw passes through the first mounting hole 121 and is fixedly connected to the door body 30 to fixedly connect the first lock plate 120 to the door body 30. The second sub-lock plate 222 has a cabinet mounting surface facing the cabinet 20, and the cabinet mounting surface may be a flat surface. The second sub-lock plate 222 is attached to an outer side of the cabinet 20 through the cabinet 20 mounting surface, and a bolt or screw passes through the second mounting hole 223 and is fixedly connected to the side wall of the cabinet 20 (when the second sub-lock plate 222 is attached to the rear side, the side wall is the rear side wall), and the second sub-lock plate 222 is firmly connected to the cabinet 20. In an embodiment, the hinge 10 may be provided on a rear side of the opening and closing device, the first lock plate 120 may be attached and fixedly connected to a rear end surface of the door body 30, and the second sub-lock plate 222 may be attached and fixedly connected to the rear side of the cabinet 20. In the closed state of the door body 30, the first lock plate 120 and the second sub-lock plate 222 are roughly provided in a vertical direction, that is, the included angle between the first lock plate 120 and the second sub-lock plate 222 is 180 degrees or approximately 180 degrees. During the opening process of the door body 30, the first lock plate 120 and the first hinge portion 110 rotate backwards synchronously, and the angle between the first lock plate 120 and the second sub-lock plate 222 on the side facing the opening and closing device is increased; and the included angle (the sum of this angle and the angle between the first lock plate 120 and the second sub-lock plate 222 on the side facing the opening and closing device is a round angle) between the first lock plate 120 and the second sub-lock plate 222 on the side away from the opening and closing device is decreased.

In some embodiments, as shown in FIGS. 1 and 2, the first lock plate 120 may be provided with three first mounting holes 121, where two first mounting holes 121 are provided at intervals and aligned along the first direction X, and one first mounting hole 121 is provided on the side of the two first mounting holes 121 close to the second sub-lock plate 222, i.e., the three first mounting holes 121 may be provided in a triangular pattern in sequence. The second sub-lock plate 222 may be provided with two second mounting holes 223, the two second mounting holes 223 provided at intervals and aligned along the first direction X.

In an embodiment, reinforcing ribs 160 may be disposed on the first lock plate 120 and the second sub-lock plate 222. For example, the first lock plate 120 is provided with one or more reinforcing ribs 160 on a surface opposite to the door body mounting surface, and the second sub-lock plate 222 is provided with one or more reinforcing ribs 160 on a surface opposite the mounting surface of the cabinet 20. The reinforcing ribs 160 may increase the strength of the first lock plate 120 and/or the second sub-lock plate 222, prolong the service life of the first lock plate 120 and the second sub-lock plate 222. The reinforcing ribs 160 may be integrated with corresponding lock plates.

In an embodiment, in order to limit the maximum opening state of the door body 30, i.e., to limit the opening degree of the door body 30, the first lock plate 120 and the second sub-lock plate 222 may be provided with corresponding stop structures. For example, the first lock plate 120 is provided with a first stop 122 on a side close to the second hinge portion 210, and the second sub-lock plate 222 is provided with a second stop 224 on a side close to the first hinge portion 110. The first stop 122 is matched the second stop 224 to limit the maximum rotation angle between the first hinge seat 100 and the second hinge portion 210 in the first rotation direction.

The first stop 122 may be integrated with the first lock plate 120, and the second stop 224 may be integrated with the second sub-lock plate 222. The first stop 122 may be disposed on a surface opposite to the door body 30 mounting surface on the first lock plate 120, and the second stop 224 may be disposed on an end surface connected to a cabinet body connection surface on the second sub-lock plate 222.

According to some embodiments of the present application, the first hinge portion 110 is provided with a second accommodating cavity 130, the second opening of the second accommodating cavity 130 is provided opposite to the first opening and communicates with the first opening, the first matching structure 140 is provided in the second accommodating cavity 130, and an end of the first hinge portion 110 with the second opening is connected in a sealed manner to an end of the second hinge portion 210 with the first opening.

The second accommodating cavity 130 may be in a shape of cylindrical in with an annular cross-section.

The first matching structure 140 and the second matching structure 310 are matched to slide and in order to improve the smoothness of sliding and reduce the wear of the first matching structure 140 and the second matching structure 310, and lubricating oil may be added between the first matching structure 140 and the second matching structure 310. The first hinge portion 110 is provided with the second accommodating cavity 130, the second accommodating cavity 130 is connected in a sealed manner to and communicates with the first accommodating cavity 230, and the first matching structure 140 and the second matching structure 310 may be in a relatively sealed environment, which ensures a long-term use and storage of the lubricating oil.

Figure 7:
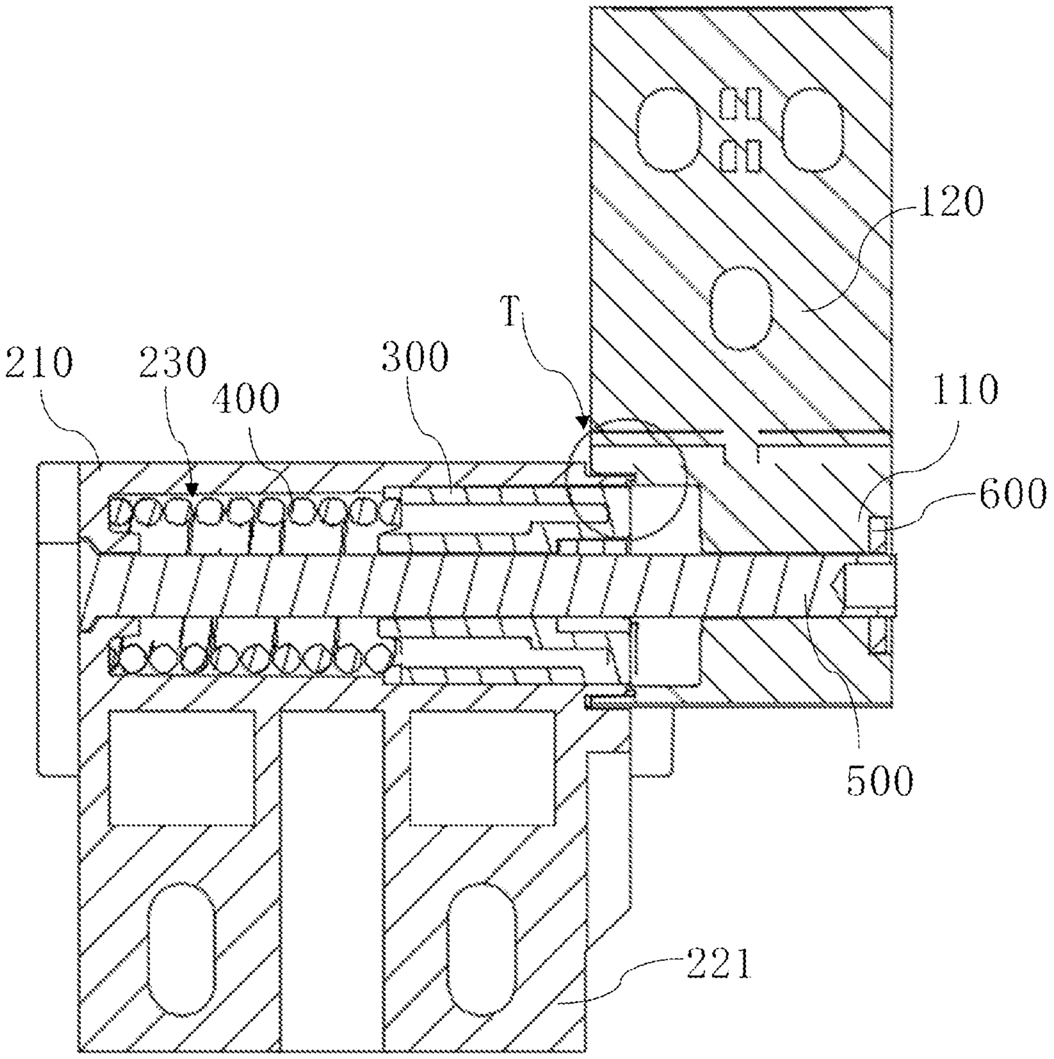
FIG. 7 is a schematic section diagram of a hinge in another direction according to embodiments of the present application.
Figure 8:
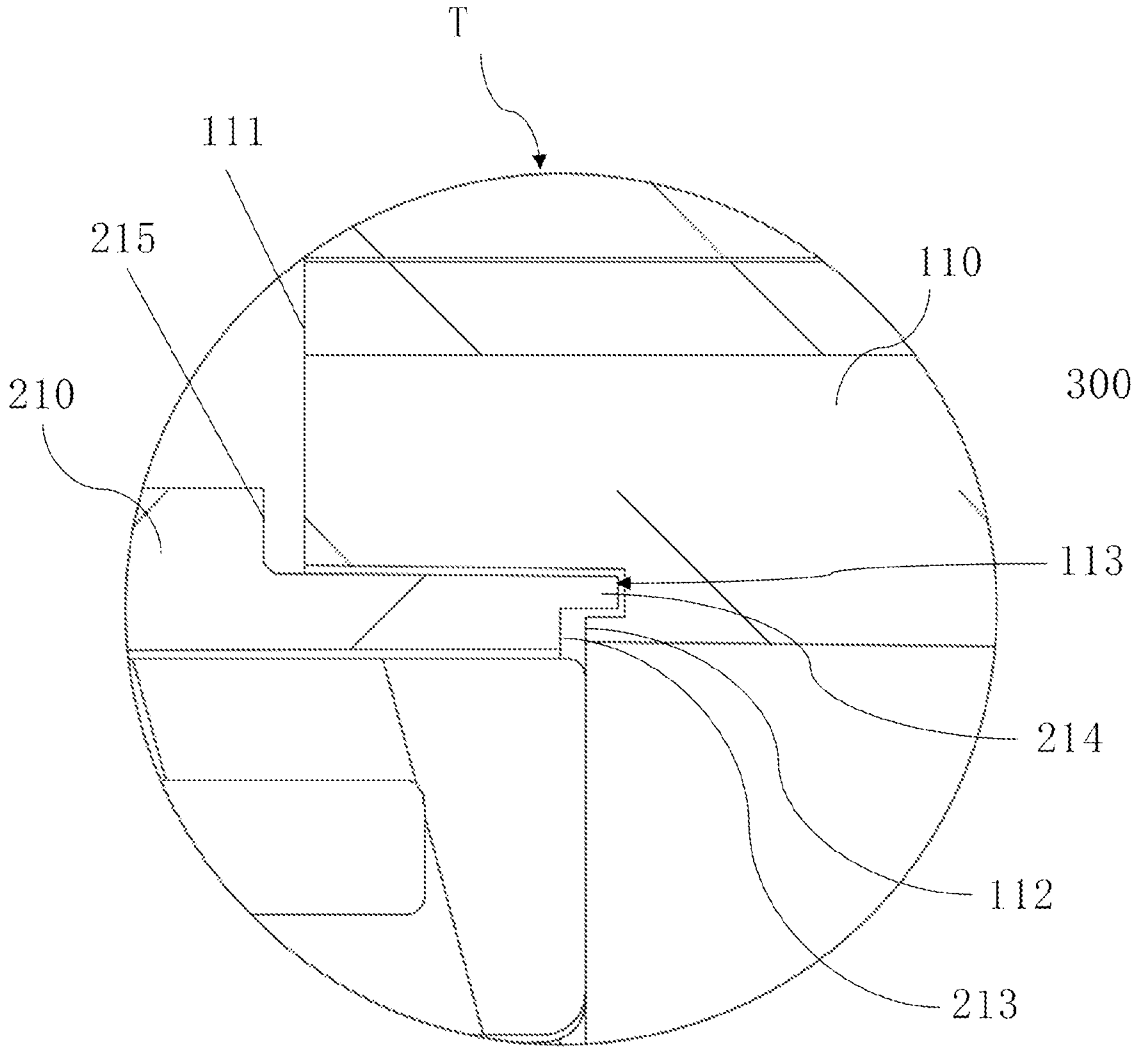
FIG. 8 is a schematic enlarged view of the T-part in FIG. 7.

As shown in FIGS. 7 and 8, in an embodiment, an end surface of the second hinge portion 210 with the first opening is provided with an annular first connecting surface 215 and an annular boss 213 protruding from the first connecting surface 215 and the annular boss 213 is located on an inner side of the first connecting surface 215 along a radial direction. An end surface of the first hinge portion 110 with the second opening is provided with an annular second connecting surface 111 and an annular step 112 recessed relative to the second connecting surface 111 And a second step is located on an inner side of the second connecting surface 111 along a radial direction. After the first hinge portion 110 is connected to the second hinge portion 210, the first connecting surface 215 is opposite to the second connecting surface 111, the annular boss 213 is corresponding to the concave annular step 112, and the annular boss 213 and the annular step 112 may be provided with an annular groove 113 and an annular protrusion 214 matched with each other. For example, the annular boss 213 may be provided with an annular protrusion 214, the annular step 112 may be provided with the annular groove 113, and the annular protrusion 214 is inserted into and matched with the annular groove 113.

By the matching structure between the annular protrusion 214 on the annular boss 213 and the annular groove 113 on the annular step 112, an oil receiving structure, i.e., a sealing groove structure, may be formed on an end surface of the first hinge portion 110 connected to the second hinge portion 210, which reduces the risk of leaking the lubricating oil from the connecting end surface of the first hinge portion 110 and the second hinge portion 210.

Figure 10:
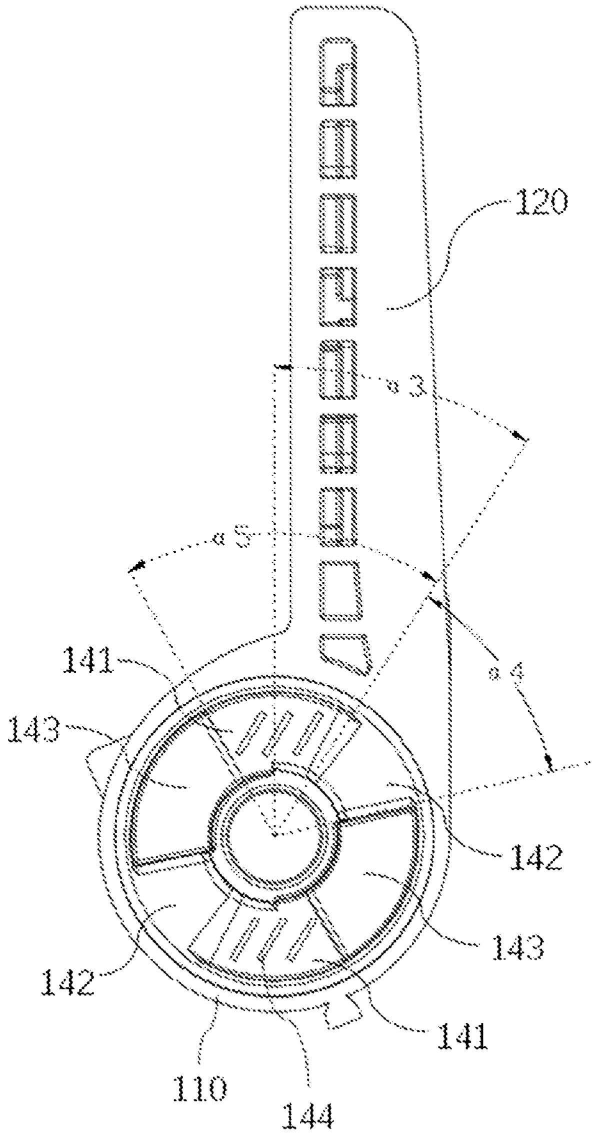
FIG. 10 is a schematic diagram of a first hinge seat from a perspective according to embodiments of the present application.
Figure 11:
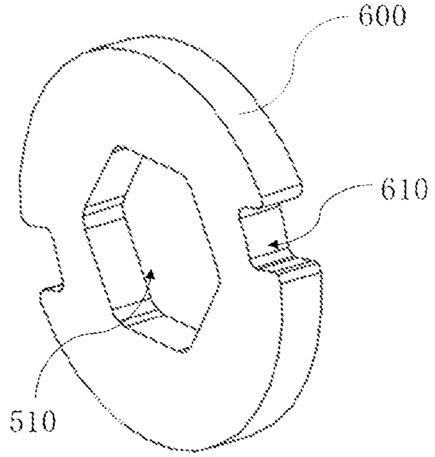
FIG. 11 is a schematic diagram of a shim according to embodiments of the present application.

According to some embodiments of the present application, as shown in FIGS. 4 and 10, at least one of the first matching surface 142, the second matching surface 312, the first curved surface 141 or the second curved surface 311 may be provided with an oil storage tank 144.

For example, the oil storage tank 144 may be disposed on any one of the first matching surface 142, the second matching surface 312, the first curved surface 141, and the second curved surface 311, or on two, three or four of the second curved surface 142, the fourth curved surface 312, the first curved surface 141, and the third curved surface 311.

The oil storage tank 144 is a groove formed on a corresponding surface, and one or more oil storage tanks 144 may be disposed on the same matching surface or the same curved surface.

As shown in FIGS. 4 and 10, in an embodiment of the present application, a sliding structure of the first matching structure 140 of the first hinge seat 100 is provided with the oil storage tank 144, i.e., the oil storage tank 144 may be disposed on the first curved surface 141.

The oil storage tank 144 may be used to store a part of lubricating oil. When the first hinge seat 100 rotates relative to the second hinge seat 200, the lubricating oil may be stored in the oil storage tank 144 to reduce the wear of the first matching structure 140 and the second matching structure 310.

According to some embodiments of the present application, at least one of the first hinge portion 110 or the second hinge portion 210 is provided with a relief hole 250, the relief hole 250 communicates with the first accommodating cavity 230. When the first hinge portion 110 is provided with the relief hole 250, the relief hole 250 provided on the first hinge portion 110 may communicate with the second accommodating cavity 130. The relief hole 250 also communicates with the first accommodating cavity 230 since the second accommodating cavity 130 communicates with the first accommodating cavity 230.

Figure 5:
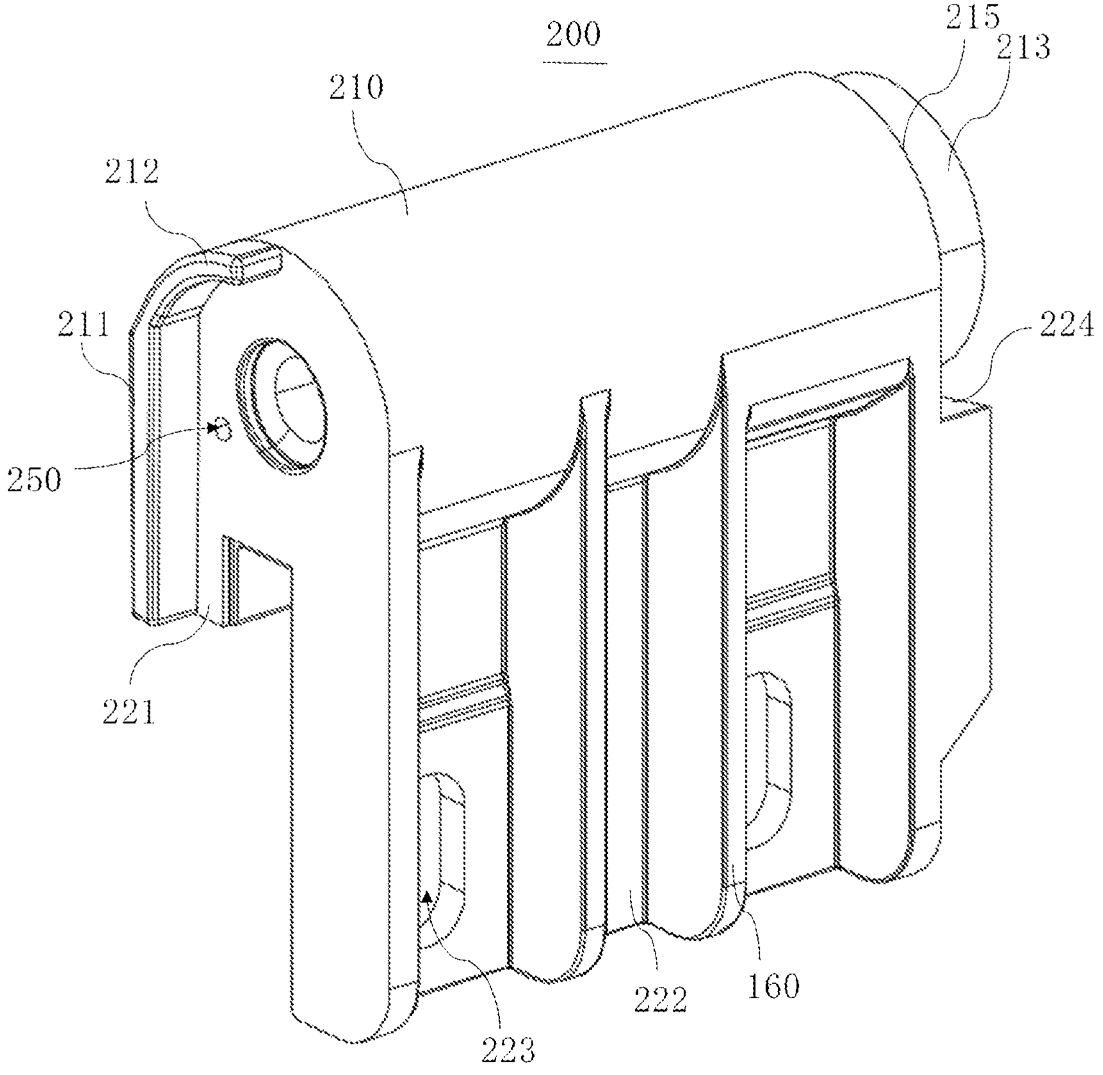
FIG. 5 is a schematic diagram of a second hinge seat from a perspective according to embodiments of the present application.

In an embodiment, as shown in FIGS. 1 and 5, an end of the second hinge portion 210 away from the first opening may also be provided with the relief hole 250, and the relief hole 250 communicates with the first accommodating cavity 230.

When the hinge 10 rotates, the lubricating oil inside the hinge 10, i.e., inside the first accommodating cavity 230 and an accommodating groove, is squeezed, and the internal space is compressed, resulting in increase in local pressure. By setting the relief hole 250, oil leakage caused by the imbalance of internal air pressure may be avoided.

It should be noted that the relief hole 250 should be disposed above an oil level of the lubricating oil that may be stored in the first accommodating cavity 230 to reduce the risk of leaking the lubricating oil from the relief hole 250.

According to some embodiments of the present application, the first hinge seat 100 may be provided with a first positioning portion 150, the second hinge seat 200 may be provided with a second positioning portion 240. The second positioning portion 240 may be matched with the first positioning portion 150 to position the first hinge seat 100 and the second hinge seat 200 at an initial mounting angle, and the first positioning portion 150 may be disconnected from the first hinge seat 100, and/or the second positioning portion 240 may be disconnected from the second hinge seat 200.

The initial mounting angle is a positioning angle during the assembly process of the first hinge seat 100 and the second hinge seat 200. Generally, after the first hinge seat 100 and the second hinge seat 200 are assemble, the hinge 10 is connected to the opening and closing device. In order to facilitate the connection of the hinge 10 with the door body 30 and the cabinet 20 of the opening and closing device, an angle between a first mounting seat facilitating the mounting of the first hinge seat 100 and the door body 30 and a second mounting seat facilitating the mounting of the second hinge seat 200 and the cabinet 20 may be taken as the initial mounting angle. In the present embodiment, when the door body 30 is in a closed state, it is most convenient to assemble the hinge seat and the opening and closing device, and no torque is applied between the first hinge seat 100 and the second hinge seat 200. Therefore, the initial mounting angle may be approximately 180 degrees between the first lock plate 120 of the first hinge seat 100 and the second sub-lock plate 222 of the second hinge seat 200.

The first positioning portion 150 and the second positioning portion 240 are matched to form a self-locking structure of the hinge 10, and the first hinge seat 100 and the second hinge seat 200 are temporarily fixed. The first hinge seat 100 may not rotate relative to the second mounting seat, and may position a mounting position between the first hinge seat 100 and the second hinge seat 200 to reduce the risk of mounting the first hinge seat 100 and the second hinge seat 200 by mistake.

The first positioning portion 150 may be disconnected from the first hinge seat 100, and which may be understood that the connection between the first positioning portion 150 and the first hinge seat 100 may be released, this disconnection may be destructive that may not be recovered or detachable. Similarly, the second positioning portion 240 may be disconnected from the second hinge seat 200, and this disconnection may be destructive that may not be recovered or detachable.

In an embodiment, one of the first positioning portion 150 and the second positioning portion 240 is a groove structure, and the other thereof is a protrusion. Taking the first positioning portion 150 as the protrusion and the second positioning portion 240 as the groove, when the hinge 10 is assembled, the protrusion structure of the first hinge seat 100 is assembled into the groove structure of the second hinge seat 200 to prevent the hinge 10 from rotating. A root of the protrusion structure is thinned. After the hinge 10 is mounted the first time, as an opening of the door body 30, due to the protrusion structure being stuck in the groove, the protrusion structure is broken from the root to disconnect the first hinge seat 100 from the second hinge seat 200 in the circumferential direction, and rotate the hinge 10.

Furthermore, the groove structure may also be designed with a slope to allow the broken protrusion structure to flow out of the groove structure along the slope, which prevents the protrusion structure from leaving in the hinge 10.

According to some embodiments, an outer circumferential wall of the sliding member 300 may be provided with a first guiding structure 320 extending along the first direction X, and the first accommodating cavity 230 of the second hinge seat 200 may be provided with a second guiding structure 231 extending along the first direction X. The first guiding structure 320 and the second guiding structure 231 are matched to fix the sliding member 300 and the second hinge seat 200 relative to each other in the circumferential direction of the first accommodating cavity 230, and move the sliding member 300 in the first direction X.

For example, the first guiding structure 320 and the second guiding structure 231 may be matching of raised strips and recessed grooves. For example, in the present embodiment, the outer circumferential wall of the sliding member 300 is provided with the recessed grooves, and the inner wall of the first accommodating cavity 230 is provided with the raised strips. The raised strips are provided in the recessed groove, and the raised strips and the recessed groove may slide relative to each other in the first direction X. The raised strips may be in one-to-one correspondence with the recessed grooves, and for example, the number of the raised strips and recessed grooves may be 2 to 8. In the present embodiment, the number of the raised strips and the recessed grooves are four respectively, the four raised strips are arranged at an equal interval along the circumference of the first accommodating cavity 230, and the four corresponding recessed grooves are arranged at an equal interval along the circumference of the sliding member 300.

By the first guiding structure 320 and the second guiding structure 231, the sliding member 300 may move in the stretching and retracting directions of the elastic member 400 (i.e., spring), i.e., the first direction X, and the rotation of the sliding member 300 may be limited, and the sliding member 300 may only slide along the stretching and retracting directions of the elastic member 400 (i.e., spring).

The first hinge seat 100, the second hinge seat 200, and the sliding member 300 in the present embodiment are all made of hard plastic parts, for example, wear-resistant materials such as POM (Polyformaldehyde) or nylon.

The hinge 10 in the present embodiment may be assembled through a connecting shaft 500. The first hinge portion 110, the second hinge portion 210, the sliding member 300, and the elastic member 400 are all provided with through holes 510. The through holes 510 may be coaxial with the first accommodating cavity 230 and the second accommodating cavity 130. When the elastic member 400 is a spring, the through hole 510 of the elastic member 400 is the internal space within the spiral line of the spring, and the connecting shaft 500 passes through the first hinge portion 110 (including the first matching structure 140), the sliding member 300 (including the second matching structure 310), the elastic member 400, and the second hinge portion 210 in order to fix the first hinge seat 100, the second hinge seat 200, the elastic member 400, and the second hinge seat 200 as a whole. The connecting shaft 500 may be fixed by riveting, or it may be fixed and connected by nuts at one or both ends of the connecting shaft 500.

Furthermore, an end of the first hinge portion 110 away from the second hinge portion 210 may be provided with a shim 600, and the connecting shaft 500 may be riveted or fixed with a nut after passing through the shim 600.

A notch 610 may be disposed at the edge of the shim 600, and an end surface of the first hinge portion 110 matched with the shim 600 may be provided with a protruding structure. The protruding structure is matched with the notch 610 to prevent the shim 600 from rotating with the first hinge seat 100.

It should be noted that the shim 600 may also be provided at an end of the second hinge portion 210 away from the first hinge portion 110.

Figure 9:
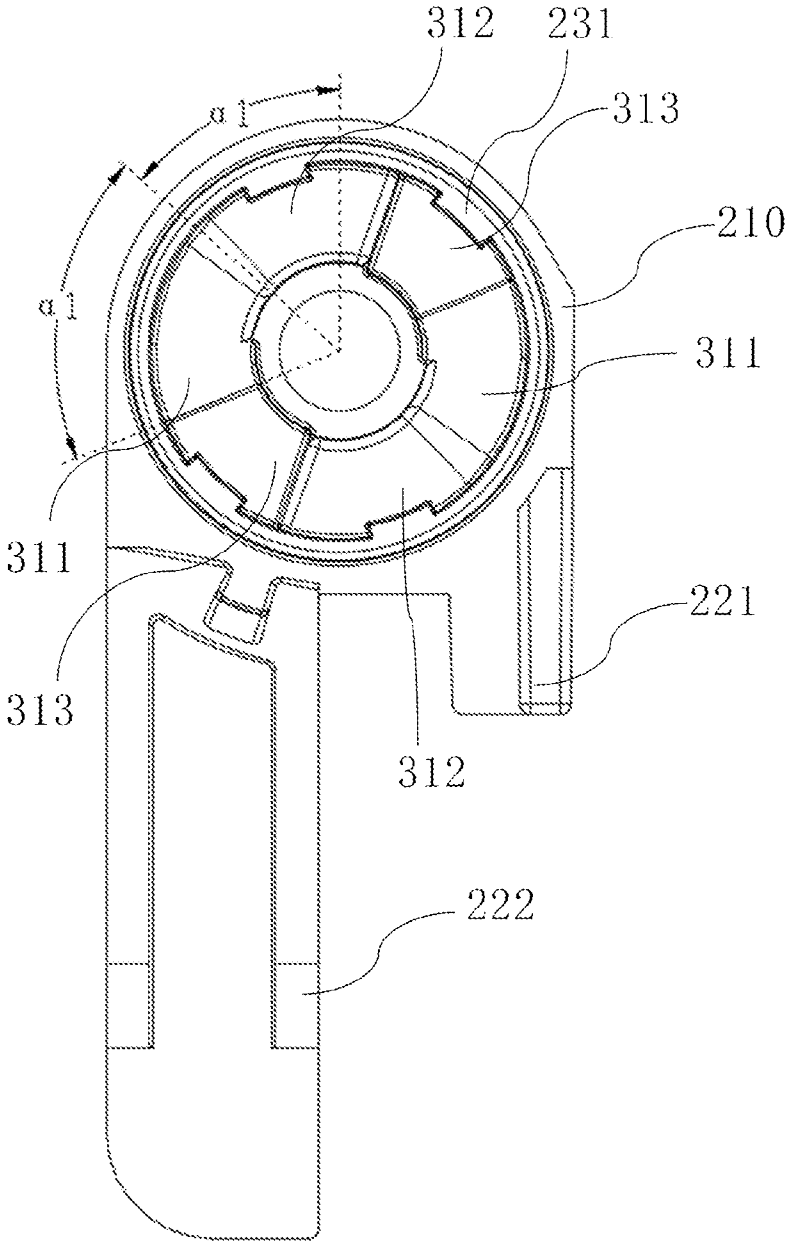
FIG. 9 is a schematic diagram of an assembly of a second hinge seat and a sliding member from a perspective according to embodiments of the present application.

As shown in FIGS. 9 and 10, in the present embodiment, the central angle corresponding to the second matching surface 312 of the hinge 10 is α1. The central angle corresponding to the second curved surface 311 is α2. In an initial state that the door body 30 is closed (in the initial state, a part of the first matching surface 142 abuts against the second matching surface 312, and the first matching surface 142 also has another part suspended opposite the second curved surface 311), the central angle corresponding to the projection area formed by the projection of the second matching surface 312 towards the first curved surface 141 is α3, the central angle corresponding to the first matching surface 142 is α4, and the central angle corresponding to the second curved surface 311 is α5. Angles of α1, α2, α3 and α4 determine an angle, during the movement of the hinge 10, at which the hinge 10 enters the position of the slope (i.e., the second curved surface 311) of the sliding member 300 from the top of the sliding member 300 (i.e., the second matching surface 312), that is, the angle at which spring force acts on the first hinge seat 100; the minimum hovering angle when opening the door may be determined by adjusting the difference of angle α1 and angle α3; the difference of angle α1 and angle α3 is the minimum hover angle when opening the door, which may be 15 degrees to 45 degrees, providing a good user experience; angle α2 and angle α5 determine the opening angle of the hinge 10. The designed opening angle of the door body 30 is generally between 70 degrees and 90 degrees, preferably 80°. To ensure that the spring still has an enough force on hinge 10 after opening the door and keep the door body 30 supported, the angle α2 and the angle α5 of the hinge 10 is designed greater than 55°, preferably 60°; when designing the angle α4, considering the reliability of the closed position of a door and the risk of reverse rotation in the event of a shaking of an upper seat, a design angle of 45° is preferred.

It should be noted that, the centers of α1, α2, α3, α4 and α5 are all located on the axis of rotation of the first hinge seat relative to the second hinge seat.

Figure 6:
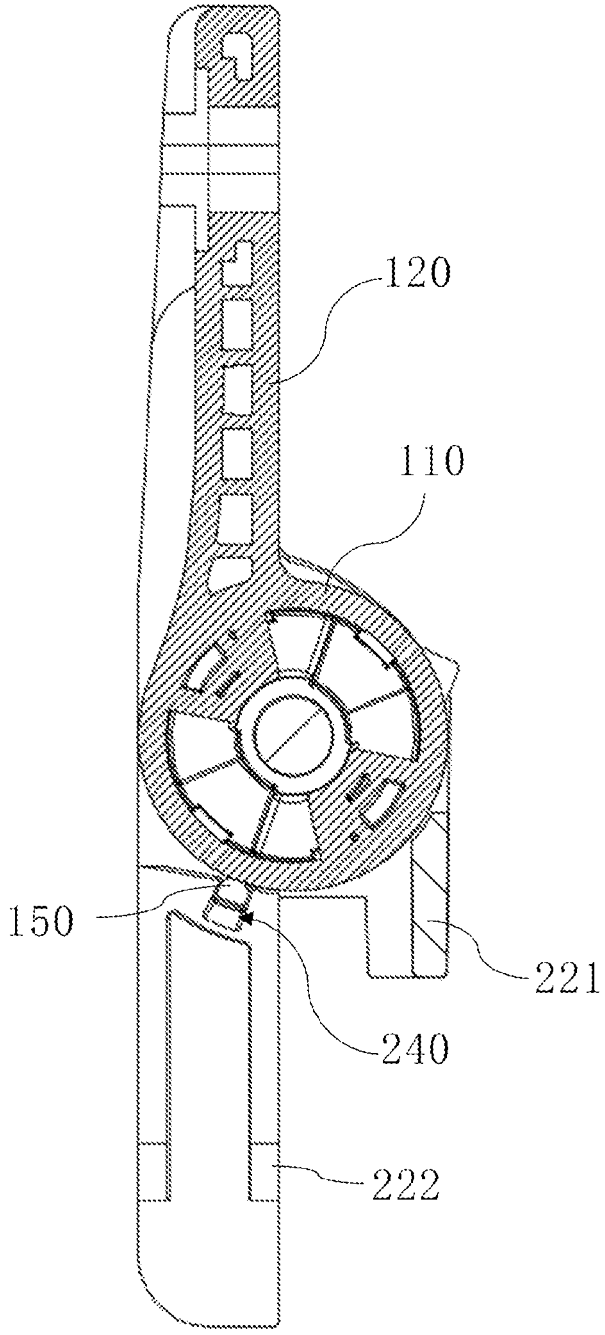
FIG. 6 is a schematic section diagram of a hinge in a direction according to embodiments of the present application.
Figure 12:
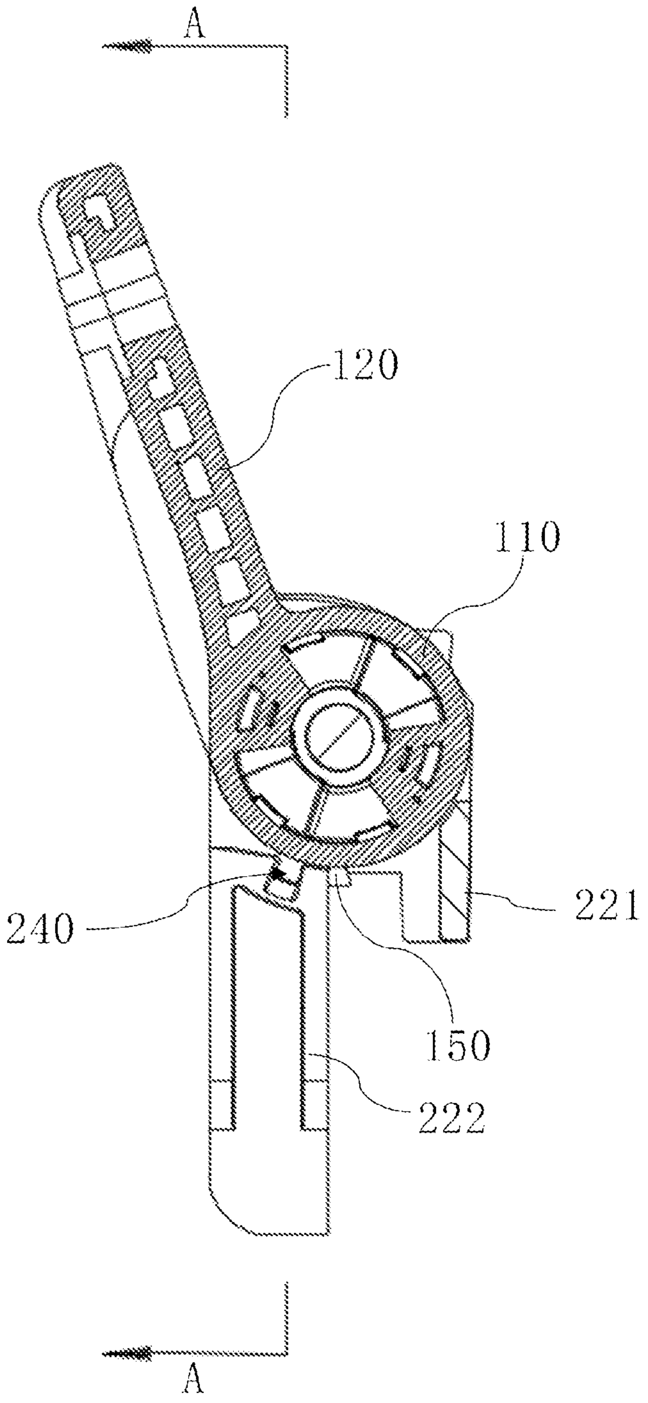
FIG. 12 is a schematic section diagram of a hinge in a direction according to embodiments of the present application.
Figure 13:
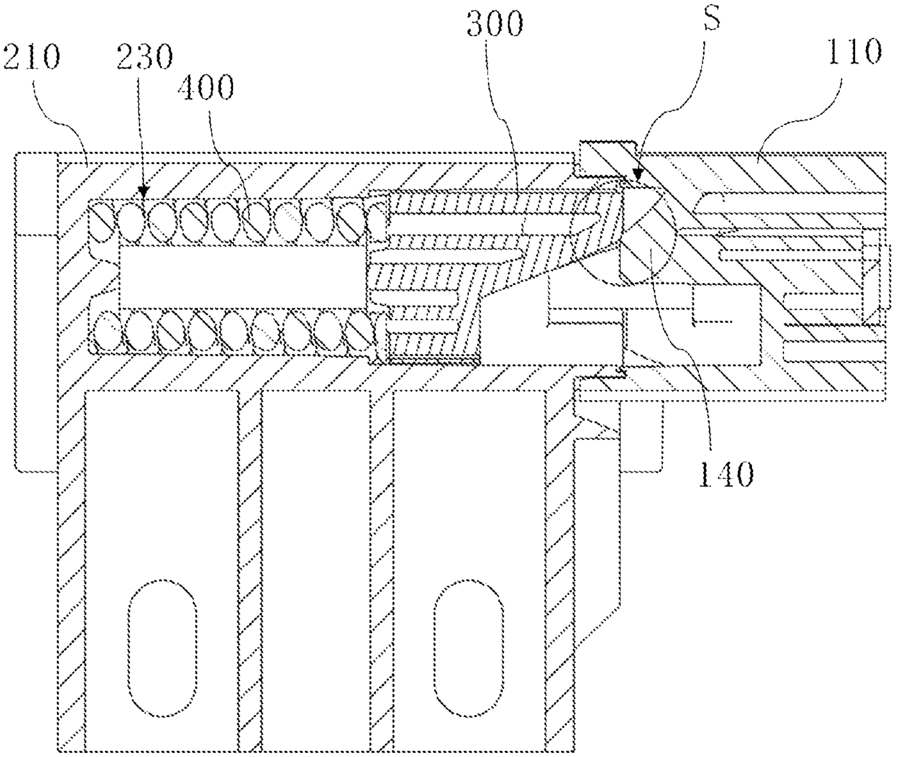
FIG. 13 schematically illustrates an A-A cross-sectional view in FIG. 12.
Figure 14:
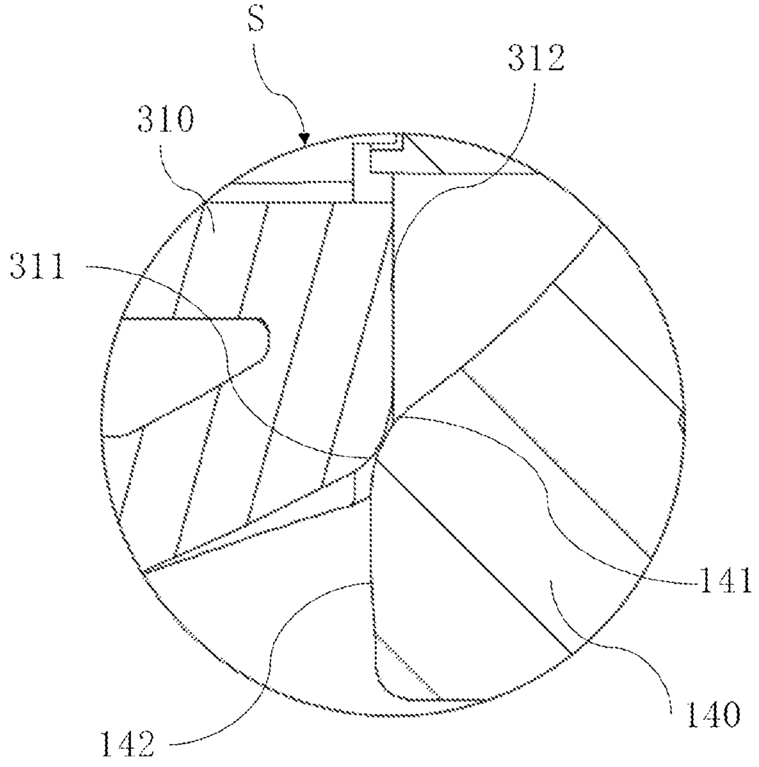
FIG. 14 schematically illustrates an enlarged view of part S in FIG. 13.
Figure 15:
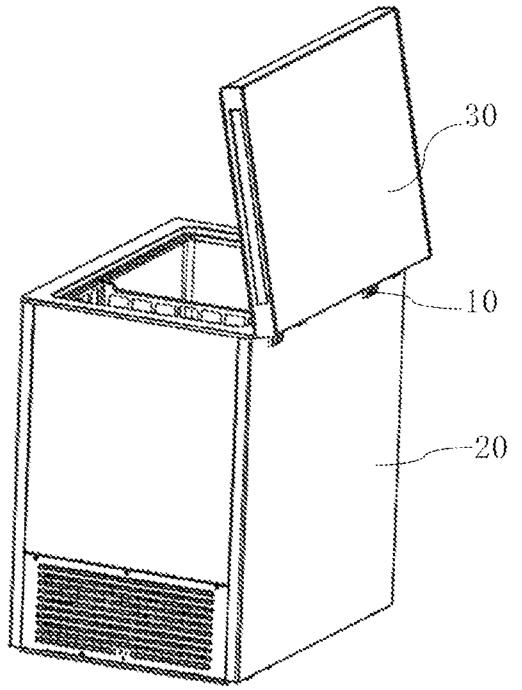
FIG. 15 is a schematic diagram of an opening and closing device according to embodiments of the present application.

In the present embodiment, the initial state at the completion of initial assembly of the hinge 10 is shown in FIGS. 1, 6, and 7. When hinge 10 may be assembled to the opening and closing device in the initial state, the door body 30 mounting surface is coplanar with the cabinet 20 mounting surface, and the top sliding surface (the first matching surface 142) of the first hinge seat 100 is in contact with the top mounting surface (the second matching surface 312) of the sliding member 300. The spring force is transmitted to the top sliding surface of the first hinge seat 100 through the top sliding surface of sliding member 300, and the force is transmitted along the axial direction, and the sliding member 300 of the first hinge seat 100 is not subjected to a lateral force, thereby not generating a force to open the door; when the door body 30 is opened and the hinge 10 rotates, the top sliding surface of the first hinge seat 100 remains in contact with the top mounting surface of the sliding member 300; when the hinge 10 rotates to an angle (the angle depends on the size of the top surface, combined with user experience and a requirement for force to open the door; the angle may be 20-40°), as shown in FIGS. 12, 13, and 14, the sliding slope (the first curved surface 141) of the first hinge seat 100 contacts the sliding slope (the second curved surface 311) of the sliding member 300. The spring force acts on the sliding member 300, and the sliding member 300, through the angle of the slope of the sliding member 300, decomposes the force into forces along the axis and perpendicular to the tangent of the slope; the force perpendicular to the tangent may be decomposed into a force perpendicular to the axis and under the action of this force, the first hinge seat 100 is subjected to a force that opens the door upwards, which may offset part of the gravity force of the door body 30 and assist in opening the door; as the rotation angle of the hinge 10 increases, the force acting on the upper seat decreases and the torque of the door body 30 for rotation decreases, and the force required to open the door body 30 also decreases, to achieve a multi-angle hovering of the door body 30; as the rotation angle of the hinge 10 further increases, the first stop 122 of the first hinge seat 100 contacts the second stop 224 of the second hinge seat 200, preventing the door body 30 from continuing to open.

Some embodiments of the present application further provide an opening and closing device, including a cabinet 20 and a door body 30. An end of the cabinet 20 has an opening 206, and the door body 30 is hinged to the opening 206 of the cabinet 20 through the hinge 10 proposed in the present application or any embodiment of the present application. A first rotation direction is the same as a rotation direction when the door body 30 is opened.

The opening and closing device may be a freezer, especially the bedroom freezer with an upward opening door. The opening and closing device may also be other devices that may be opened and closed, such as a dishwasher, a storage cabinet, etc. In a case where the opening and closing device is the bedroom freezer, the first hinge seat 100 is the upper seat connected to the door body 30, the second hinge seat 200 is the lower seat connected to the cabinet 20 (i.e., the cabinet body), and the freezer further includes control parts for controlling the cooling.

Taking the bedroom freezer as an example, when the freezer is in a closed state, the top (i.e., the first matching surface 142) of the first matching structure 140 of the first hinge seat 100 contacts the top (i.e., the second matching surface 312) of the second matching structure 310 of the sliding member 300 embedded in the second hinge seat 200. The elastic member 400 (i.e., the spring) is in a compressed state, but the force of the spring cannot be transmitted to the rotation direction, thereby not assisting in opening the door; when the door body 30 of the freezer opens under the force of a hand of a user, the slope (i.e., the first curved surface 141) of the first matching structure 140 of the first hinge seat 100 contacts the slope (i.e., the second curved surface 311) of the second matching structure 310. The thrust of the spring acts on the first hinge seat 100 through the slope (i.e., the curved surface), providing a force assisting the door body 30 to open, and the spring has the function of assisting the door body 30 to open; in addition, the support force provided by the spring to the door body 30 is balanced with the gravity and friction of the door body 30, and the support force may play a role in the hovering of the door body 30 in a door opening state.

Below are two embodiments introducing two types of structures of the opening and closing device.

Figure 20:
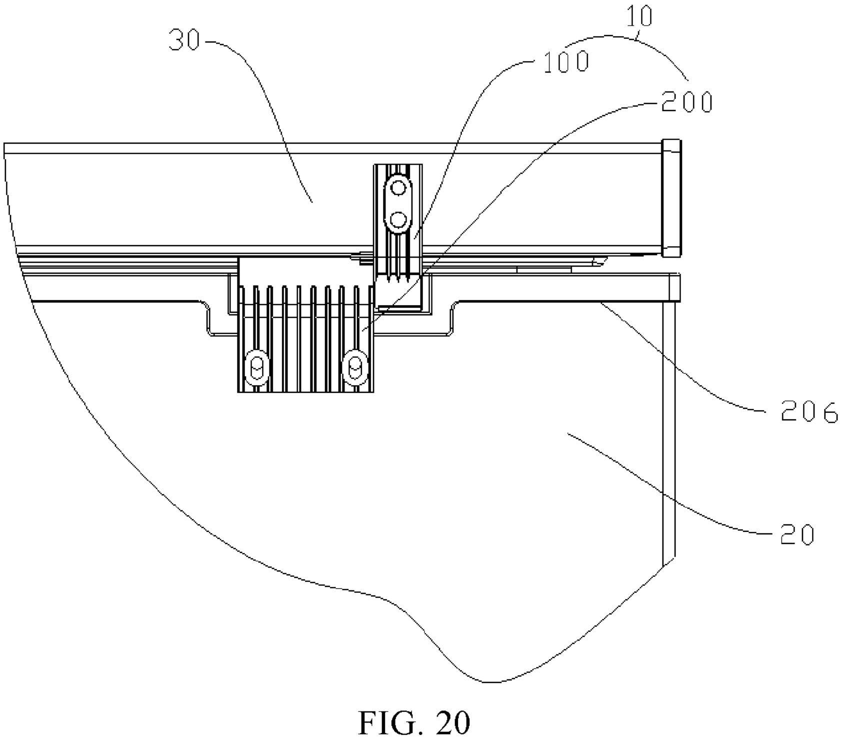
FIG. 20 is a schematic partial diagram of an opening and closing device according to embodiments of the present application.
Figure 21:
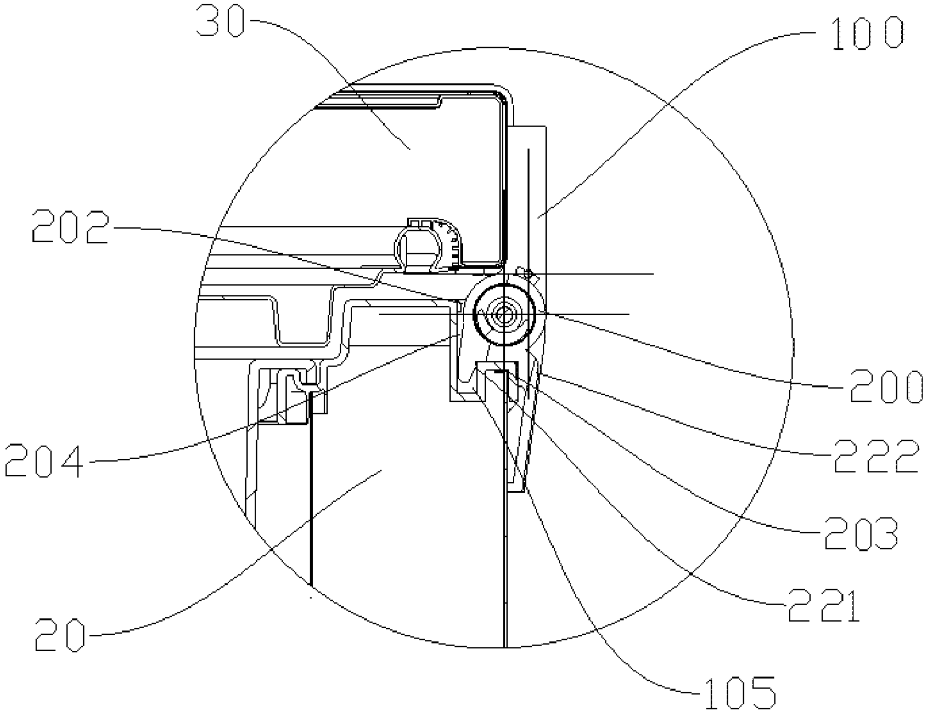
FIG. 21 is a schematic assembly diagram of the second hinge seat on the cabinet in FIG. 20.

As shown in FIGS. 20 and 21, in one embodiment, the outer wall of the cabinet 20 is provided with a mounting cavity 204 recessed towards an interior of the cabinet 20, the mounting cavity 204 is provided with a third opening 202 facing the opening and a fourth opening 203 facing the exterior of the cabinet 20, and a side of the mounting cavity 204 away from the third opening 202 is provided with a trench 105; the door body 30 may be connected to the opening 206 of the cabinet 20 through the hinge 10 for opening and closing. The hinge 10 includes a second hinge seat 200 and a first hinge seat 100 rotatably connected. The first hinge seat 100 is connected to the side wall of the door body 30, and both hinged ends of the second hinge seat 200 and the first hinge seat 100 are provided in the mounting cavity 204. A first sub-lock plate 221 and a second sub-lock plate 222 are provided on a hinged end of the second hinge seat 200 facing away from the first hinge seat 100, the first sub-lock plate 221 is embedded in the trench 105, and the second sub-lock plate 222 is connected to the outer wall of the door body 30.

The opening and closing device provided in the embodiments of the present application, the hinge 10 for connecting the door body 30 and the cabinet 20 includes the second hinge seat 200 and the first hinge seat 100 rotatably connected, where the second hinge seat 200 is connected to the outer surface of the door body 30, and both the hinged ends of the second hinge seat 200 and the first hinge seat 100 are provided in the mounting cavity 204. Since the mounting cavity 204 is recessed from the outer wall of the cabinet 20 to the interior of the cabinet 20, the size of the hinge 10 protruding outside the cabinet 20 may be reduced to a certain extent, the gap between the device and a package box for packaging the device is decreased, the packaging quantity of the product is improved, the transportation costs of the product is reduced, and good practicality is achieved.

The cabinet 20 may be provided with only one or more openings. When openings are disposed, door bodies 30 may also be provided. Some of the door bodies 30 may be connected to the opening of the corresponding cabinet 20 using the above assembly method. For door bodies 30 that do not affect the packing quantity, the assembly method in relevant technologies may also be used without any restrictions.

The opening of the freezer is usually disposed at the top of the product. If the opening is provided at other parts, it may be adjusted accordingly and will not be elaborated here.

The first hinge seat 100 may include a first lock plate 120, the first lock plate 120 may be provided with two second mounting holes 223, and the second mounting hole 223 may be a bolt hole. The first lock plate 120 is connected to the door body 30 through a bolt provided in the corresponding second mounting hole 223 to assemble the first hinge seat 100 onto the door body 30.

The second mounting hole 223 of the embodiments of the present application may be disposed at intervals in the vertical direction, and only two bolts are required to assemble the first lock plate 120 onto the door body 30. In other embodiments, the second mounting hole 223 may also be disposed at intervals in the horizontal direction, or more second mounting holes 223 may be provided, without limitation herein.

Figure 3:
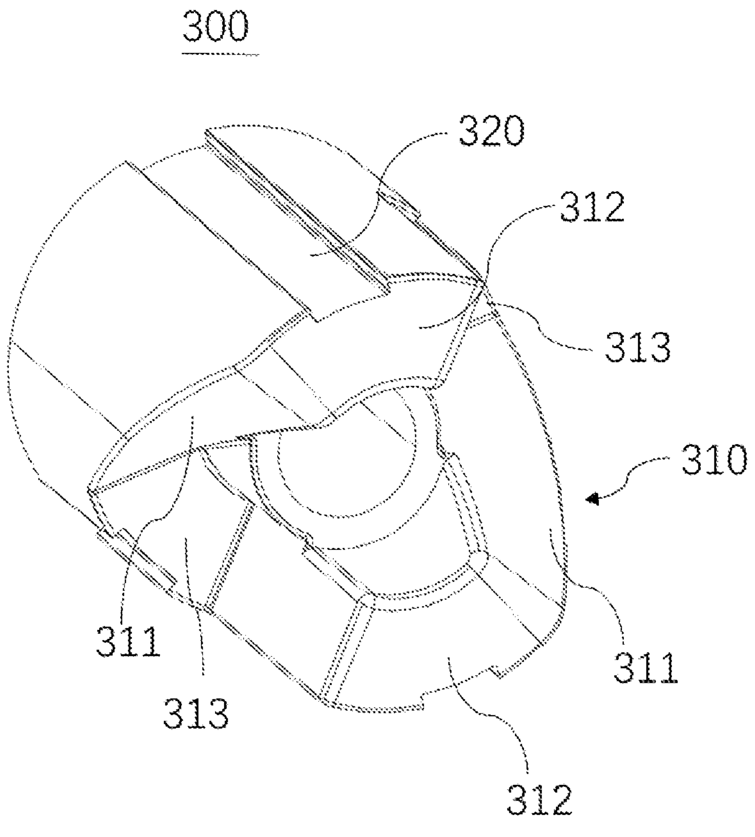
FIG. 3 is a schematic diagram of a sliding member from a perspective according to embodiments of the present application.

Referring to FIGS. 1, 3, and 5, the hinged end of the first hinge seat 100 may be cylindrical and is integrated with the first lock plate 120. A side of the first lock plate 120 facing the door body 30 is a flat surface, and the side of the first lock plate 120 facing away from the door body 30 may be provided with reinforcing ribs 160. The reinforcing rib 160 may be vertically disposed, and the reinforcing rib 160 may extend from the first lock plate 120 to the circumferential surface of the hinged end of the first hinge seat 100 to enhance the strength of the first hinge seat 100, and prolong the service time of the first hinge seat 100.

The hinged end of the first hinge seat 100 is provided with a second accommodating cavity 130, and the second accommodating cavity 130 may be provided in a cylindrical shape. The axial end of the second accommodating cavity 130 facing the second hinge seat 200 is provided with an opening, the opening being the second opening.

The hinged end of the second hinge seat 200 may also be cylindrical, and the first sub-lock plate 221 and the second sub-lock plate 222 may be provided opposite on both sides of the hinged end of the second hinge seat 200. The first sub-lock plate 221 and the second sub-lock plate 222 may be integrated with the hinged end of the second hinge seat 200. The vertical size of the second sub-lock plate 222 may be larger than the vertical size of the first sub-lock plate 221 to facilitate the assembly of the first sub-lock plate 221 and the second sub-lock plate 222 on the mounting cavity 204. The second sub-lock plate 222 is provided with two first mounting holes 121, and the first mounting holes 121 may be a bolt hole. The second sub-lock plate 222 is connected to the outer side of the cabinet 20 through a bolt provided in the corresponding first mounting hole 121. The first mounting hole 121 may be rounded rectangular, which facilitates the adjustment of the mounting position of the second hinge seat 200 and the assembly of the hinge 10 on the opening and closing device.

The first mounting holes 121 according to the embodiments of the present application may be disposed at intervals in the horizontal direction, and only two bolts are required to assemble and connect the second sub-lock plate 222 to the cabinet 20. In other embodiments, the first mounting hole 121 may also be disposed at intervals in the vertical direction, or more first mounting holes 121 may be provided, without limitation herein.

It should be noted that the first mounting hole 121 and the second mounting hole 223 in the embodiments of the present application are both counter bores to avoid corresponding bolts protruding out of the surface and affecting the packaging quantity of the product.

The side of the second sub-lock plate 222 facing away from the first sub-lock plate 221 (i.e., the outer side of the second sub-lock plate 222) is provided with reinforcing ribs 160. The reinforcing ribs 160 may be provided in the vertical direction, and may extend from the second sub-lock plate 222 to the circumferential surface of the hinged end of the second hinge seats to improve the strength of the second hinge seat 200 and prolong the service time of the second hinge seat 200.

The hinged end of the second hinge seat 200 is provided with a first accommodating cavity 230, and the first accommodating cavity 230 may be provided in a cylindrical shape. The second accommodating cavity 130 is open towards the axial end of the first hinge seat 100, i.e., a second opening is provided. The second accommodating cavity 130 and the first accommodating cavity 230 are provided opposite to each other, an end of the second accommodating cavity 130 and the first accommodating cavity 230 is open, and an opposite end of the second accommodating cavity 130 and the first accommodating cavity 230 is respectively pressed against two ends of the trench 105.

As shown in FIGS. 1 to 19, some embodiments are mainly different from other embodiments in that the connection structure between the hinge 10, the cabinet 20, and the door body 30 is different.

For example, the first lock plate 120 may be provided with three first mounting holes 121, where the two first mounting holes 121 are provided at intervals and aligned in the first direction X, and one first mounting hole 121 is provided on the side of the two first mounting holes 121 close to the second sub-lock plate 222, that is, the three first mounting holes 121 may be provided in a triangular pattern in sequence.

The door body 30 is provided with a slot 207 at both ends of the trench 105, and raised strip 211 protrudes from the end surface of the second hinge portion 210 away from the first hinge seat 100. Both ends of the trench 105 are provided with slots 207. The first hinge seat 100 and the second hinge seat 200 are provided in the mounting cavity 204, and the raised strips 211 is inserted into the slot 207 at the corresponding end. The slot 207 are matched with the raised strips 211 to embed and fix the first sub-lock plate 221 and the cabinet 20.

Furthermore, the second hinge portion 210 is provided with an extension portion 212 integrated with the raised strip 211 on an end surface away from the first hinge seat 100. During the rotation of the first hinge seat 100 relative to the second hinge seat 200, the raised strip 211 is prone to be damaged due to stress concentration. By providing an extension portion 212, the length of the raised strips 211 is extended, and the strength of the corresponding raised strip 211 is enhanced. In actual testing, the possibility of the raised strip 211 being damaged was found greatly reduced.

It should be noted that a raised strip 211 may also be provided on an end surface of the first hinge portion 110 facing away from the second hinge portion 210, and the raised strips 211 may also be matched with the corresponding slot 207 at a corresponding end.

The above is only some embodiments of the present application, but the scope of protection of the present application is not limited to this. Any change or alternative that may be easily construed within the scope of disclosure in the present application should be covered within the scope of protection of the present application. Therefore, the scope of protection of the present application should be based on the scope of protection of the claims.

What is claimed is:

1. A hinge configured to be used in an opening and closing device, the opening and closing device comprising a cabinet and a door body, the cabinet having an opening, the door body hinged to the opening of the cabinet through the hinge;

wherein an outer wall of the cabinet is provided with a mounting cavity recessed towards an interior of the cabinet, and a side of the mounting cavity is provided with a trench, the cabinet is provided with a slot at an end of the trench;

wherein the hinge comprises:

a first hinge seat, having a first matching structure;

a second hinge seat, having a first accommodating cavity extending in a first direction, wherein an end of the first accommodating cavity has a first opening, the first hinge seat and the second hinge seat are provided in the mounting cavity;

a sliding member, provided in the first accommodating cavity, wherein the sliding member and the second hinge seat are fixed relatively in a circumferential direction of the first accommodating cavity, the sliding member is slidable along the first direction in the first accommodating cavity, and the sliding member has a second matching structure, the second matching structure abuts against the first matching structure; and an elastic member, provided in the first accommodating cavity and located at an end of the sliding member facing away from the first matching structure, wherein the elastic member applies a thrust to the sliding member to move the sliding member towards the first matching structure;

wherein the first matching structure has a first curved surface and a first matching surface, the second matching structure has a second curved surface and a second matching surface, the hinge has a first state and a second state, and the first hinge seat is reciprocally rotatable relative to the second hinge seat around an axis extending in the first direction within a predetermined angle range to slide the first matching structure relative to the second matching structure and switch the hinge between the first state and the second state; and in the first state, the first matching surface abuts against the second matching surface, and in the second state, the first curved surface abuts against the second curved surface to cause the first hinge seat and the second hinge seat to have a force for relative rotation under the thrust;

wherein an outer circumferential wall of the sliding member is provided with a first guiding structure extending in the first direction, and the second hinge seat in the first accommodating cavity is provided with a second guiding structure extending in the first direction, the first guiding structure is matched with the second guiding structure to fix the sliding member and the second hinge seat relatively in a circumferential direction of the first accommodating cavity, and to move the sliding member along the first direction;

wherein the first hinge seat comprises a first lock plate and a first hinge portion, and the first hinge portion comprises the first matching structure;

wherein the second hinge seat comprises a second lock plate and a second hinge portion, the first accommodating cavity is provided with the second hinge portion, and the second lock plate comprises a first sub-lock plate and is connected to the cabinet;

wherein the first sub-lock plate is embedded in the trench of the opening and closing device, a raised strip protrudes from an end surface of the second hinge portion away from the first hinge seat and is inserted into the slot, and the slot matches with the raised strip to maintain position of the first sub-lock plate in the cabinet.

2. The hinge of claim 1, wherein at least one of the first curved surface or the second curved surface is helical surface.

3. The hinge of claim 1, wherein the first curved surface extends along the first direction, and the first matching surface is provided at an end of the first curved surface close to the second matching structure; and the second curved surface extends along the first direction, and the second matching surface is provided at an end of the second curved surface close to the first matching structure.

4. The hinge of claim 3, wherein both the first matching surface and the second matching surface are perpendicular to the first direction.

5. The hinge of claim 1, wherein the first lock plate is integrated with the first hinge portion.

6. The hinge of claim 5, wherein the second lock plate is integrated with the second hinge portion.

7. The hinge of claim 6, wherein the first lock plate is provided with a first mounting hole, the first mounting hole is matched with a fixing member to fix the first lock plate on an opening and closing device; and the second lock plate comprises a second sub-lock plate, the first sub-lock plate and the second sub-lock plate are provided at intervals, the first sub-lock plate is embedded in the trench of the opening and closing device, and the second sub-lock plate is provided with a second mounting hole, the second mounting hole is matched with a fixing member to connect the second sub-lock plate with the opening and closing device.

8. The hinge of claim 6, wherein the first hinge portion is provided with a second accommodating cavity, the second accommodating cavity is provided with a second opening, the second opening is opposite to and communicates with the first opening, the first matching structure is provided in the second accommodating cavity, and an end of the first hinge portion with the second opening is connected to an end of the second hinge portion with the first opening in a sealed manner.

9. The hinge of claim 8, wherein at least one of the first matching surface, the second matching surface, the first curved surface or the second curved surface is provided with an oil storage tank.

10. The hinge of claim 8, wherein the second hinge portion is provided with a relief hole at an end away from the first opening, the relief hole communicates with the first accommodating cavity; and/or the first hinge portion is provided with a relief hole at an end away from the second opening, the relief hole communicates with the second accommodating cavity.

11. The hinge of claim 7, wherein a side of the first lock plate close to the second hinge portion is provided with a first stop, a side of the second sub-lock plate close to the first hinge portion is provided with a second stop, and the first stop is matched with the second stop to limit a maximum angle for rotation between the first hinge seat and the second hinge portion.

12. The hinge of claim 1, wherein the first hinge seat is provided with a first positioning portion, and the second hinge seat is provided with a second positioning portion, the second positioning portion is matched with the first positioning portion to position the first hinge seat and the second hinge seat at an initial mounting angle, the first positioning portion is configured to disconnect from the first hinge seat, and the second positioning portion is configured to disconnect from the second hinge seat.

13. The hinge of claim 1, wherein the first hinge seat, the second hinge seat, and the sliding member are all made of hard plastic parts.

14. An opening and closing device, comprising:

a cabinet, having an opening; and a door body, hinged to the opening of the cabinet through a hinge;

wherein an outer wall of the cabinet is provided with a mounting cavity recessed towards an interior of the cabinet, and a side of the mounting cavity is provided with a trench, the cabinet is provided with a slot at an end of the trench;

wherein the hinge comprises:

a first hinge seat, having a first matching structure;

a second hinge seat, having a first accommodating cavity extending in a first direction, wherein an end of the first accommodating cavity has a first opening, the first hinge seat and the second hinge seat are provided in the mounting cavity;

a sliding member, provided in the first accommodating cavity, wherein the sliding member and the second hinge seat are fixed relatively in a circumferential direction of the first accommodating cavity, the sliding member is slidable along the first direction in the first accommodating cavity, and the sliding member has a second matching structure, the second matching structure abuts against the first matching structure; and an elastic member, provided in the first accommodating cavity and located at an end of the sliding member facing away from the first matching structure, wherein the elastic member applies a thrust to the sliding member to move the sliding member towards the first matching structure;

wherein the first matching structure has a first curved surface and a first matching surface, the second matching structure has a second curved surface and a second matching surface, the hinge has a first state and a second state, and the first hinge seat is reciprocally rotatable relative to the second hinge seat around an axis extending in the first direction within a predetermined angle range to slide the first matching structure relative to the second matching structure and switch the hinge between the first state and the second state; and in the first state, the first matching surface abuts against the second matching surface, and in the second state, the first curved surface abuts against the second curved surface to cause the first hinge seat and the second hinge seat to have a force for relative rotation under the thrust;

wherein an outer circumferential wall of the sliding member is provided with a first guiding structure extending in the first direction, and the second hinge seat in the first accommodating cavity is provided with a second guiding structure extending in the first direction, the first guiding structure is matched with the second guiding structure to fix the sliding member and the second hinge seat relatively in a circumferential direction of the first accommodating cavity, and to move the sliding member along the first direction;

wherein the first hinge seat comprises a first lock plate and a first hinge portion, and the first hinge portion comprises the first matching structure;

wherein the second hinge seat comprises a second lock plate and a second hinge portion, the first accommodating cavity is provided with the second hinge portion, and the second lock plate comprises a first sub-lock plate and is connected to the cabinet;

wherein the first sub-lock plate is embedded in the trench of the opening and closing device, a raised strip protrudes from an end surface of the second hinge portion away from the first hinge seat and is inserted into the slot, and the slot matches with the raised strip to maintain position of the first sub-lock plate in the cabinet.

15. The opening and closing device of claim 14, wherein the opening and closing device is a freezer.

16. The opening and closing device of claim 14, wherein at least one of the first curved surface or the second curved surface is helical surface.

17. The opening and closing device of claim 14, wherein the first curved surface extends along the first direction, and the first matching surface is provided at an end of the first curved surface close to the second matching structure; and the second curved surface extends along the first direction, and the second matching surface is provided at an end of the second curved surface close to the first matching structure.

18. The opening and closing device of claim 17, wherein both the first matching surface and the second matching surface are perpendicular to the first direction.

19. The opening and closing device of claim 14, wherein the first lock plate is integrated with the first hinge portion.

* * * * *